US008497960B2

(12) United States Patent
Hiroya et al.

(10) Patent No.: US 8,497,960 B2
(45) Date of Patent: Jul. 30, 2013

(54) LIQUID-CRYSTAL DISPLAY DEVICE

(71) Applicant: NEC LCD Technologies, Ltd., Kanagawa (JP)

(72) Inventors: Tsutomu Hiroya, Kanagawa (JP); Koji Shigemura, Kanagawa (JP); Jin Matsushima, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/665,054

(22) Filed: Oct. 31, 2012

(65) Prior Publication Data
US 2013/0057810 A1    Mar. 7, 2013

Related U.S. Application Data

(62) Division of application No. 13/279,922, filed on Oct. 24, 2011, now Pat. No. 8,325,303, which is a division of application No. 12/099,268, filed on Apr. 8, 2008, now abandoned.

(30) Foreign Application Priority Data

May 18, 2007   (JP) .................................. 2007-132644

(51) Int. Cl.
*G02F 1/1333* (2006.01)
(52) U.S. Cl.
USPC ........................... 349/122; 349/129; 349/187

(58) Field of Classification Search
None
See application file for complete search history.

(56) References Cited

U.S. PATENT DOCUMENTS 6,621,542 B1    9/2003 Anuga

FOREIGN PATENT DOCUMENTS

| JP | 8-136704 | 5/1996 |
|----|----------|--------|
| JP | 3496675  | 11/2003 |

*Primary Examiner* — Richard Kim
(74) *Attorney, Agent, or Firm* — Young & Thompson

(57) ABSTRACT

A liquid-crystal display device makes it possible to attach an optical element to a liquid-crystal display panel with high positional accuracy while avoiding or minimizing the enlargement of the picture-frame region (i.e., the non-display region) induced by the formation of markers on the panel and the increase of the fabrication cost. The panel comprises a main substrate, an opposite substrate, and a liquid crystal enclosed in a gap between the main and opposite substrates, wherein a polarizer plate is attached at least to the opposite substrate. Markers for attaching an optical element to the panel are formed at positions that overlap with the polarizer plate in a non-display region on the main or opposite substrate. Alignment direction regulators regulate the alignment of the liquid crystal molecules to a predetermined direction in the vicinities of the markers, allowing light to pass through at least the opposite substrate.

1 Claim, 20 Drawing Sheets

LIQUID-CRYSTAL DISPLAY DEVICE

BACKGROUND OF THE INVENTION

1. Field of the Invention

The present invention relates to a Liquid-Crystal Display (LCD) device and a method of fabricating the same and more particularly, to a LCD device comprising markers which are used in the attachment or placement operation of an optical element to a LCD panel, and a method of fabricating the device.

2. Description of the Related Art

In recent years, the LCD device has been extensively used as small-sized display devices such as projector apparatuses, portable telephones, and so on, rapidly by exploiting its characteristics of low power dissipation, small weight, and thinness. If an optical element such as a lens is attached to the LCD panel, highly value-added products may be provided.

To exploit the characteristics of an optical element at the maximum when the element is attached to an LCD panel, it is necessary to attach or place the element to the panel with high positional accuracy. To realize such the high-precision attachment or placement operation as described here, it is required that markers are respectively formed on the panel and element in advance and then, an attachment or placement operation between the panel and the element is performed while reading the markers.

With a LCD panel whose picture-frame region located outside the display region is narrowed (i.e., a LCD panel having a narrowed picture-frame region), there is scarcely an extra space in the outside area of the sealing material and therefore, the markers are disposed in the non-display region formed inside the sealing material. In this case, since two polarizer plates are attached to the each side of the panel in such a way as to cover the sealing material to prevent the leakage of light, the markers are disposed below one of the polarizer plates (i.e., on the side nearer to the liquid crystal layer). The optical element is placed and attached onto the said polarizer plate that has been attached to the LCD panel and thus, the markers on the panel need to be read by way of the polarizer plate or plates.

With the transmissive type LCD device, it is usual that two polarizer plates are respectively attached to the two surfaces of the LCD panel in such a way that their absorption axes are intersected at right angles. Therefore, if this device is designed to operate in the normally black mode, light does not penetrate through the panel unless an ON voltage is applied to the liquid-crystal molecules. Accordingly, there is a problem that the markers on the panel are unable to be read in the placement or attachment operation of the element to the panel. On the other hand, if this device is designed to operate in the normally white mode, light penetrates through the panel without application of an ON voltage to the liquid-crystal molecules. However, alignment films are formed only the inside of the display region. Therefore, similar to the LCD device operating in the normally black mode, there is a problem that the markers formed in the non-display region where the alignment films do not exist are unable to be read.

With the reflective type LCD device, external light which has entered into the incident side of the LCD panel is reflected by the reflective electrodes (or the reflective plates) provided on the opposite side to the incident side of the panel, thereby making it possible to display images. Accordingly, the external light thus entered into the panel penetrates twice through one of the polarizer plates provided on the incident side of the panel, which is different from that of the transmissive type LCD device.

For example, in a case where the reflective type LCD device is designed to operate in the Vertical Aligned (VA) mode, if linearly polarized light enters the LCD panel by way of the entrance-side polarizer plate, the linearly polarized light will penetrate through a quarter wavelength ($\lambda/4$) plate (i.e., an optical retardation film) disposed adjacent to the entrance-side polarizer plate to be, for example, left-handed circularly polarized light and then, it will reach the reflective electrodes and reflected by the same. The reflected light generated by the reflection on the reflective electrodes will be, for example, right-handed circularly polarized light and then, will penetrate through the $\lambda/4$ plate to be linearly polarized light. Since this linearly polarized light is perpendicular in polarization plane to the incident linearly polarized light, it will be unable to penetrate through the entrance-side polarizer plate unless an ON voltage is applied to the liquid-crystal molecules. Accordingly, with the reflective type LCD device also, there is a problem that the markers are unable to be read in the attachment operation of the optical element to the panel. This is similar to the transmissive type LCD device designed to operate in the normally black mode.

Moreover, with the reflective type LCD device, it is usual that the obtainable contrast due to the reflected light generated by the reflective electrodes is low. Therefore, there is another problem that the markers cannot be recognized with high accuracy.

The semi-transmissive or trans-reflective type LCD device comprises the structure obtained by combining the transmissive type LCD device and the reflective type LCD device together. Therefore, the above-described explanations for the transmissive and reflective type LCD devices are applied to the semi-transmissive type LCD device.

Taking the above-described problems into consideration, a variety of improvements have ever been made so far.

For example, the Japanese Patent No. 3496675 issued on Feb. 16, 2004 discloses a method of fabricating a LCD device. In this method, a polarizer plate located on a driver substrate and a polarizer plate located on an opposite substrate are coupled together in such a way as to have a positional deviation. Marks are formed on the non-overlapped parts of the substrates formed by this deviation. In this way, the marks can be made readable by way of the polarizer plates. FIG. 1 shows the LCD panel disclosed in this Patent.

The LCD panel shown in FIG. 1 comprises an upper glass 101 and a lower glass 102 as a pair of substrates where a liquid crystal is enclosed in the gap between the glasses 101 and 102, an upper polarizer plate 103 attached to the upper glass 101, and a lower polarizer plate 104 attached to the lower glass 102. Four marks 105a, 105b, 105c, and 105d are formed on the lower glass 102. The upper polarizer plate 103 is placed outside the upper glass 101. The lower polarizer plate 104 is placed outside the lower glass 102. The upper and lower polarizer plates 103 and 104 are coupled in such a way as to be deviated from each other at a distance A along their longitudinal directions (i.e., along the lateral direction in FIG. 1). The marks 105a, 105b, 105c, and 105d are formed on the non-overlapped parts of the lower glass 102 on the left and right sides. The marks 105a and 105b are disposed on the non-overlapped part on the right side in FIG. 1. The marks 105c and 105d are disposed on the non-overlapped part on the left side in FIG. 1.

In the Japanese Patent No. 3496675, it is said that the marks 105a, 105b, 105c, and 105d can be read with eyes, a CCD (Charge-Coupled Device) camera, or the like, by way of the upper or lower polarizer plate 103 or 104 by disposing the marks 105a, 105b, 105c, and 105d in such the manner as above.

With the LCD panel disclosed in the Japanese Patent No. 3496675, when the upper polarizer plate 103 is attached to the upper glass 101, the end portion of the plate 103 needs to be disposed between the boundary of the display region and the marks 105a and 105b. Moreover, when the lower polarizer plate 104 is attached to the lower glass 102, the end portion of the plate 104 needs to be disposed between the boundary of the display region and the marks 105c and 105d. For this reason, taking the coupling or attachment accuracy of the upper and lower polarizer plates 103 and 104 into consideration, it is inevitable that the marks 105a, 105b, 105c, and 105d are formed to be larger than the display region in such a away as to be on the outside of the display region. Therefore, there is a problem that the distance between the display region and the sealing material for sealing or enclosing the liquid crystal will be enlarged, in other words, the picture-frame region will be widen.

Moreover, since the step or process of accurately deviating the upper and lower polarizer plates 103 and 104 and attaching the same is required, there is another problem that the fabrication cost cannot be lowered.

SUMMARY OF THE INVENTION

The present invention was created to solve the above-described problems.

An object of the present invention is to provide a LCD device that makes it possible to attach an optical element to a LCD panel with high positional accuracy while avoiding or minimizing the enlargement of the picture-frame region (in other words, the non-display region) induced by the formation of markers on the LCD panel and the increase of the fabrication cost, and a method of fabricating the LCD device.

The above object together with others not specifically mentioned will become clear to those skilled in the art from the following description.

According to the first aspect of the present invention, a LCD device is provided, which comprises:

a LCD panel comprising a main substrate, an opposite substrate, and a liquid crystal enclosed in a gap between the main substrate and the opposite substrate, wherein a polarizer plate is attached at least to the opposite substrate;

markers to be used in an attachment operation of an optical element to the LCD panel, the markers being formed at positions that overlap with the polarizer plate in a non-display region on the main substrate or the opposite substrate; and alignment direction regulators for regulating an alignment direction of molecules of the liquid crystal to a predetermined direction in vicinities of the markers, thereby allowing light to pass through at least the opposite substrate.

With the LCD device according to the first aspect of the present invention, as described above, the markers, which are to be used in the attachment operation of the optical element to the LCD panel, are formed at the positions that overlap with the polarizer plate in the non-display region on the main substrate or the opposite substrate. Moreover, due to the alignment direction regulators, the alignment direction of the molecules of the liquid crystal is regulated to the predetermined direction in the vicinities of the markers, thereby allowing light to pass through at least the opposite substrate. Therefore, when the optical element is attached to the LCD panel, the markers can be read with eyes, a CCD camera, or the like by way of the polarizer plate attached to the opposite substrate. This means that the optical element can be attached to the polarizer plate with high positional accuracy by using the markers as a reference in the attachment operation of the optical element to the LCD panel.

Furthermore, it is sufficient that the alignment direction of the molecules of the liquid crystal is regulated by the alignment direction regulators in the vicinities of the markers, thereby allowing light to pass through at least the opposite substrate. Moreover, such the alignment direction regulators as above can be easily realized by using an alignment film, pixel electrodes, or the like, included in the LCD panel and the processes used in the fabrication steps of the said LCD panel. Accordingly, the enlargement of the picture-frame region (in other words, the non-display region) due to the formation of the markers on the LCD panel (i.e., the main substrate or the opposite substrate) and the increase of the fabrication cost can be avoided or minimized.

In the LCD device according to the first aspect of the present invention, if the LCD panel is designed to operate in the normally white mode, it is sufficient that an alignment film that overlaps with the markers is provided for the alignment direction regulators. This means that light penetrates in an area where the alignment film is present in the normally white mode and therefore, it is possible to allow light to pass through the at least the opposite substrate by the alignment film that overlaps with the markers. As a result, the markers can be read by way of the polarizer plate with ayes or the like.

In the LCD device according to the first aspect of the present invention, if the LCD panel is designed to operate in the normally black mode, it is sufficient that the alignment direction regulators differentiate the alignment direction of the molecules of the liquid crystal in the vicinities of the markers from that of the molecules of the liquid crystal in a display region. Specifically, in the normally black mode, light does not penetrate through the polarizer plate (which is attached to the opposite substrate) if the alignment direction of the molecules of the liquid crystal in the vicinities of the markers is the same as that of the molecules of the liquid crystal in the display region. For this reason, the molecules of the liquid crystal in the vicinities of the markers are aligned in a different direction from that of the molecules of the liquid crystal in the display region by the alignment direction regulators, thereby allowing light to pass through at least the opposite substrate locally. As a result, the markers can be read by way of the polarizer plate with ayes or the like.

When the LCD panel is designed to operate in the normally black mode, it is preferred that the alignment direction regulators are recesses or protrusions extending along a different direction from the alignment direction of the molecules of the liquid crystal in the display region, where the recesses or protrusions are formed on a film (preferably, an organic film) in contact with the liquid crystal in the vicinities of the markers. This is because the molecules of the liquid crystal are likely to be aligned in the same direction as that of the recesses or protrusions and therefore, the alignment direction of the molecules of the liquid crystal in the vicinities of the markers can be made different from that of the molecules of the liquid crystal in the display region by the recesses or protrusions. In this case, no alignment film is placed in the vicinities of the markers.

Moreover, when the LCD panel is designed to operate in the normally black mode, each of the alignment direction regulators may be at least one electrode located in the vicinity of each of the markers, where the alignment direction of the molecules of the liquid crystal in the vicinities of the markers is differentiated from that of the molecules of the liquid crystal in the display region by applying a voltage to the electrodes. Since the vicinity of each of the markers is made transparent locally due to the application of a voltage to the at least one electrode, the markers can be read by way of the polarizer plate with eyes or the like.

When the LCD panel is of the reflective type or the semi-transmissive type, it is preferred that the markers are made of a same material as that of reflecting members. This is because the reflecting members are made of a high-reflectance material and therefore, the markers can be read with high positional accuracy using a high-intensity reflected light. In this case, any one of the above-described examples of the alignment direction regulators may be used as necessary.

In a preferred embodiment of the LCD device according to the first aspect of the invention, each of the markers has a plan shape designed in such a way that at least one of edges of the marker extends along the alignment direction of the molecules of the liquid crystal. In this embodiment, the distortion of the alignment direction of the molecules of the liquid crystal due to the height differences (i.e., the steps) caused by formation of the markers can be minimized near the height differences.

In another preferred embodiment of the LCD device according to the first aspect of the invention, at least one of the markers is located on a side or edge of the LCD panel where a liquid-crystal injection hole of the LCD panel is present. In this embodiment, the effect by the enlargement of the picture-frame region of the LCD panel due to the markers can be minimized.

According to the second aspect of the present invention, a method of fabricating a LCD device is provided, the LCD device comprising a LCD panel and an optical element attached to the LCD panel, wherein the LCD panel includes a main substrate, an opposite substrate, a liquid crystal enclosed in a gap between the main substrate and the opposite substrate, and a polarizer plate attached to at least the opposite substrate.

This method comprises the steps of:
forming markers, which are used in an attachment operation of the optical element to the LCD panel, at positions that overlap with the polarizer plate in a non-display region on the main substrate or the opposite substrate;
forming alignment direction regulators for regulating an alignment direction of molecules of the liquid crystal to a predetermined direction in vicinities of the markers, thereby allowing light to pass through at least the opposite substrate, wherein the alignment direction regulators are located on the LCD panel; and
attaching the optical element to the LCD panel while reading the markers by way of the polarizer plate.

With method of fabricating a LCD device according to the second aspect of the present invention, as described above, the markers are formed on the LCD panel at the positions that overlap with the polarizer plate in the non-display region on the main substrate or the opposite substrate. Moreover, the alignment direction regulators, which regulate the alignment direction of the molecules of the liquid crystal to the predetermined direction in the vicinities of the markers to thereby allow light to pass through at least the opposite substrate, are provided on the LCD panel. Therefore, the markers can be recognized by way of the polarizer plate. For this reason, in the step of attaching the optical element to the LCD panel, the markers can be used as a reference while reading the markers with eyes, a CCD camera, or the like, by way of the polarizer plate. Accordingly, the optical element can be attached to the LCD panel with a high positional accuracy.

Furthermore, it is sufficient that the alignment direction regulators are provided on the LCD panel. Moreover, such the alignment direction regulators as above can be easily realized by using an alignment film, pixel electrodes, or the like, included in the LCD panel and the processes used in the fabrication steps of the said LCD panel. Accordingly, the enlargement of the picture-frame region (in other words, the non-display region) due to the formation of the markers on the LCD panel and the increase of the fabrication cost can be avoided or minimized.

In the method according to the second aspect of the present invention, if the LCD panel is designed to operate in the normally white mode, it is preferred that an alignment film is formed in such a way as to overlap with the markers in the step of forming the alignment direction regulators.

In the method according to the second aspect of the present invention, if the LCD panel is designed to operate in the normally black mode, it is preferred that the alignment direction regulators are formed to differentiate the alignment direction of the molecules of the liquid crystal in the vicinities of the markers from that of the molecules of the liquid crystal in the display region in the step of forming the alignment direction regulators.

In the method according to the second aspect of the present invention, if the LCD panel is designed to operate in the normally black mode, it is preferred that recesses or protrusions are formed in such a way as to extend along a different direction from the alignment direction of the molecules of the liquid crystal in the display region in the step of forming the alignment direction regulators, where the recesses or protrusions are formed on a film (preferably, an organic film) in contact with the liquid crystal in the vicinities of the markers.

In the method according to the second aspect of the present invention, if the LCD panel is designed to operate in the normally black mode, it is preferred that at least one electrode is formed in the vicinity of each of the markers in the step of forming the alignment direction regulators. Moreover, in the step of attaching the optical element to the LCD panel, the optical element is attached to the LCD panel in the state where a voltage is applied to the electrodes to differentiate the alignment direction of the molecules of the liquid crystal in the vicinities of the markers from that of the molecules of the liquid crystal in the display region.

In the method according to the second aspect of the present invention, when the LCD panel is of the reflective type or the semi-transmissive type, it is preferred that the markers are made of a same material as that of reflecting members in the step of forming the markers.

In a preferred embodiment of the method according to the second aspect of the invention, in the step of forming the markers, each of the markers is formed to have a plan shape designed in such a way that at least one of edges of the marker extends along the alignment direction of the molecules of the liquid crystal. In this embodiment, the distortion of the alignment direction of the molecules of the liquid crystal due to the height differences (i.e., the steps) caused by formation of the markers can be minimized near the height differences.

In another preferred embodiment of the method according to the second aspect of the invention, in the step of forming the markers, at least one of the markers is located on a side or edge of the LCD panel where a liquid-crystal injection hole of the LCD panel is present. In this embodiment, the effect by the enlargement of the picture-frame region of the LCD panel due to the markers can be minimized.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
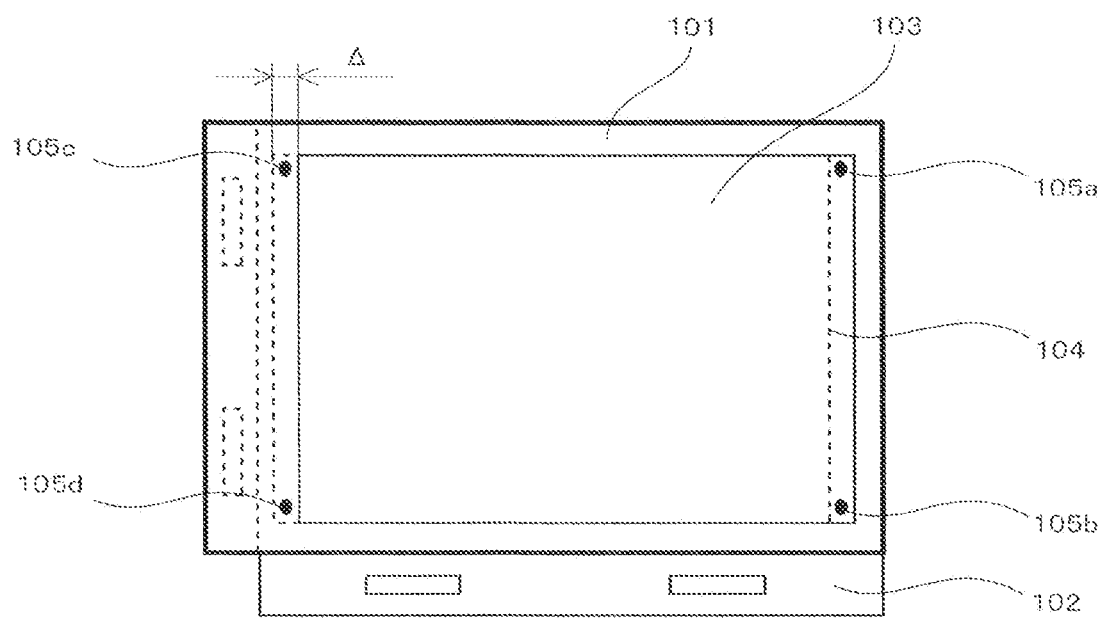
FIG. 1 is a schematic plan view of the LCD panel incorporated into a prior-art LCD device.

Preferred embodiments of the present invention will be described in detail below while referring to the drawings attached.

First Embodiment

Figure 2:
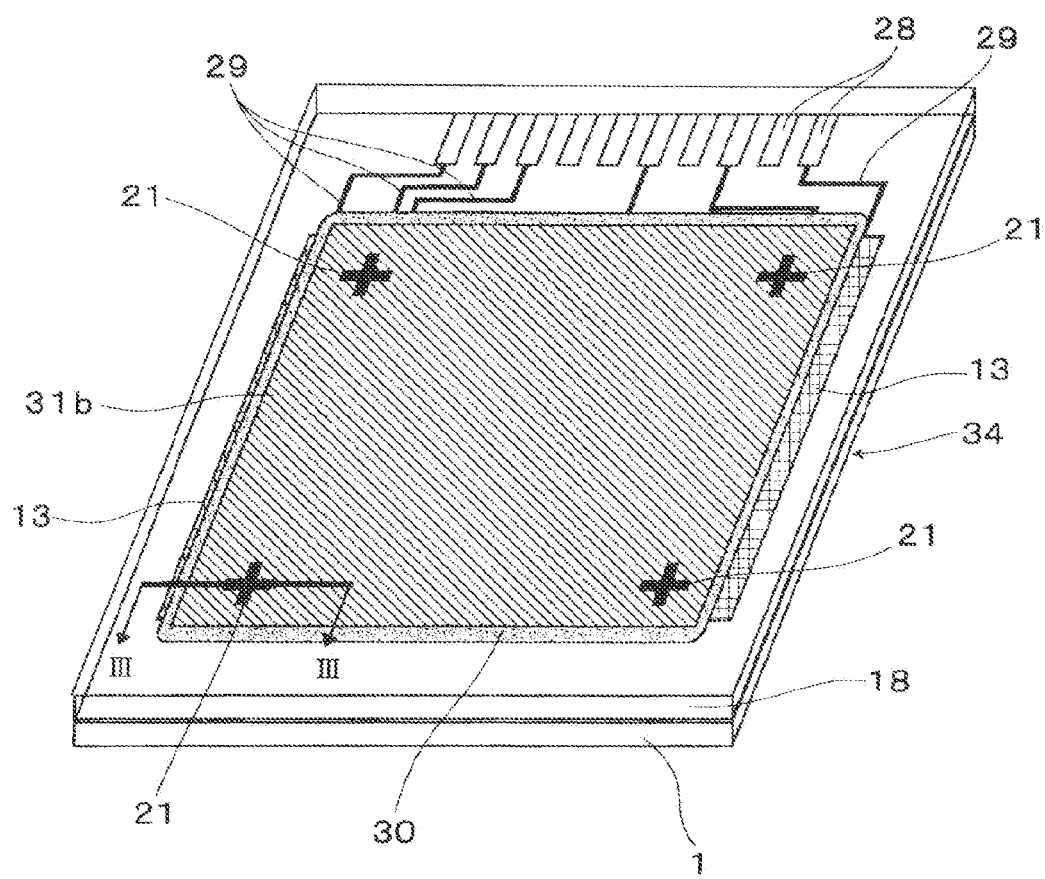
FIG. 2 is a perspective view showing the state where a polarizer plate is attached to the opposite substrate of a LCD device according to a first embodiment of the present invention.
Figure 3:
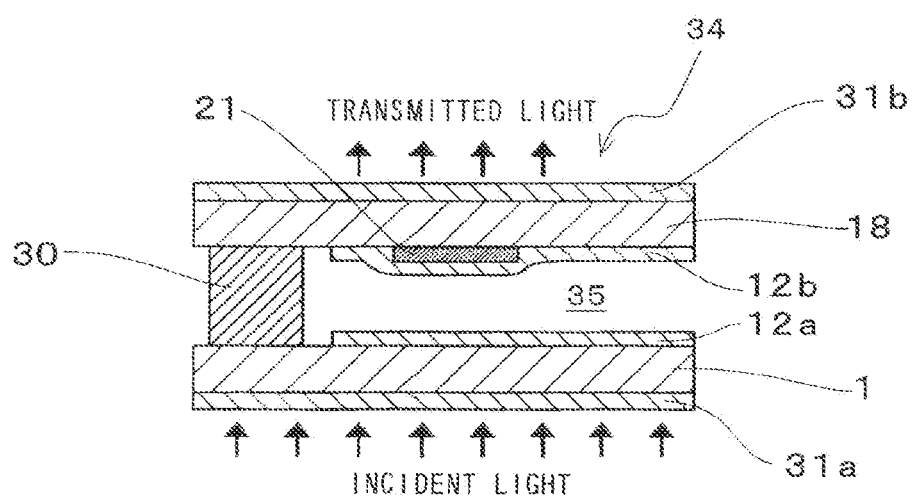
FIG. 3 is a partial cross-sectional view along the line III-III in FIG. 2.

The schematic structure of a LCD device according to a first embodiment of the present invention is shown in FIGS. 2 and 3, where the LCD device is designed to operate in the normally white mode.

In FIGS. 2 and 3, the reference numeral 34 denotes a LCD panel incorporated into the LCD device according to the first embodiment of the invention. The LCD panel 34 comprises a driver substrate 1 as a main substrate, an opposite substrate 18 coupled with the driver substrate 1 to be opposite thereto, a liquid crystal 35 (see FIG. 3) enclosed in the gap between the driver and opposite substrates 1 and 18, polarizer plates 31a and 31b attached respectively to the outer surfaces of the driver and opposite substrates 1 and 18, and four markers 21 formed respectively at the positions that overlaps with the polarizer plate 31b on the opposite substrate 18. The markers 21, each of which is made of a material with a light-shielding property (i.e., an opaque material), are used for positioning of an optical element in the attachment or placement operation of the optical element on the panel 34.

The driver substrate 1, and the opposite substrate 18 on which the markers 21 are formed, are coupled to each other with a sealing material (i.e., an adhesive) 30. The polarizer plate 31a on the driver substrate 1 and the polarizer plate 31b on the opposite substrate 18 are respectively fixed to the substrate 1 and 18 in such a way that their absorption axes are intersected at right angles. As clearly shown in FIG. 3, each of the markers 21 is formed on the inner surface of the opposite substrate 18 (i.e., the opposite surface of the substrate 18 to the polarizer plate 31b), and is located in the region surrounded by the sealing material 30 on the outside of the display region, i.e., in the non-display region. The markers 21 are provided at four positions here; however, it is sufficient for the invention that the markers 21 are provided at at least two positions. The markers 21 are covered with an alignment film 12b placed on the inner surface of the opposite substrate 18, where the alignment film 12b is superposed on an alignment film 12a placed on the inner surface of the driver substrate 1. A predetermined aligning treatment such as a rubbing treatment has been applied to the respective surfaces of the films 12a and 12b.

With the LCD device designed to operate in the normally white mode with a Twisted Nematic (TN) liquid crystal, light which has entered the inside of the LCD panel 34 from the side of the driver substrate 1 (i.e., incident light) will be linearly polarized light by the polarizer plate 31a in the inside of the display region where the molecules of the liquid crystal 35 have been aligned to a predetermined direction by the alignment films 12a and 12b. Since the plane of polarization of the linearly polarized light thus generated is then rotated by the aligned molecules of the liquid crystal 35, the said linearly polarized light is able to pass through the polarizer plate 31b on the opposite substrate 18 without application of a voltage to the liquid crystal 35. This means that transmitted light will be emitted from the panel 34 by way of the polarizer plate 31b on the opposite substrate 18.

In the first embodiment of the invention, the alignment films 12a and 12b are overlapped with the markers 21 having the light-shielding property and therefore, the panel 34 has transparency in the vicinities of the markers 21 located in the non-display region even in the state where the polarizer plates 31a and 31b are overlapped with the markers 21. Accordingly, the markers 21 can be recognized by way of the two polarizer plates 31a and 31b. For this reason, the markers 21 can be utilized as the reference in the placement or attachment operation of the optical element 32 onto the opposite substrate 18 of the LCD panel 34. As a result, the optical element 32 can be attached onto the polarizer plate 31b on the opposite substrate 18 with high positional accuracy.

Figure 4:
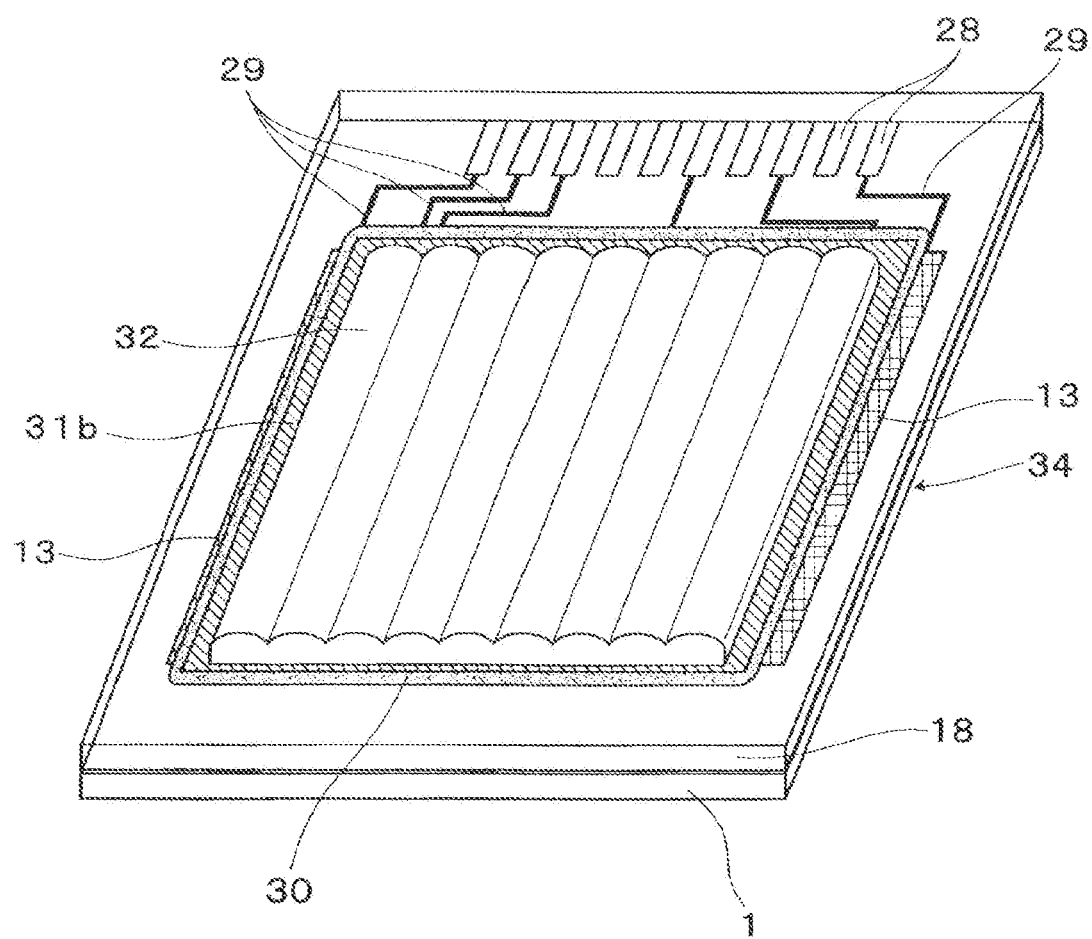
FIG. 4 is a perspective view showing the state where an optical element is attached to the LCD device according to the first embodiment of the present invention.

FIG. 4 is a perspective view showing the state where the optical element 32 is attached to the LCD device according to the first embodiment. As the element 32, for example, a lens, an optical diffusing film, or the like may be used.

With the LCD device using Thin-Film Transistors (TFTs) made of polysilicon, the electron mobility is relatively higher and therefore, the TFTs can be miniaturized for realizing higher-resolution LCD devices. Moreover, since the operating speed of the TFTs is enhanced also, the peripheral driver circuits for driving the pixels can be formed on the driver substrate 1, which makes it possible to narrow the picture-frame region. Accordingly, the LCD device comprising polysilicon TFTs is adopted as an example in the following explanation.

Figure 5A:
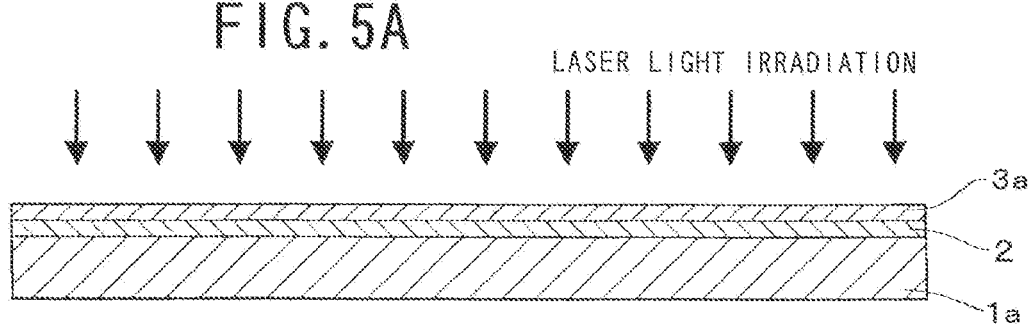
FIGS. 5A to 5J are partial cross-sectional views showing the process steps of a method of fabricating polysilicon TFTs (Thin-Film Transistors) of the LCD device according to the first embodiment of the present invention, respectively.
Figure 5B:
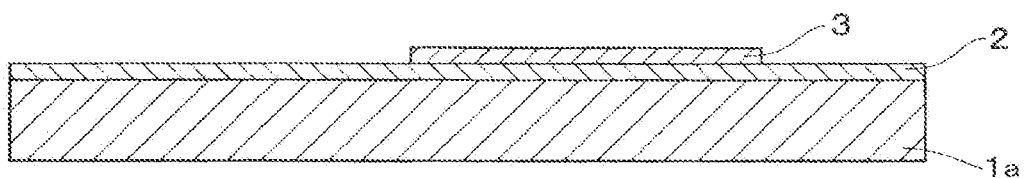
Figure 6:
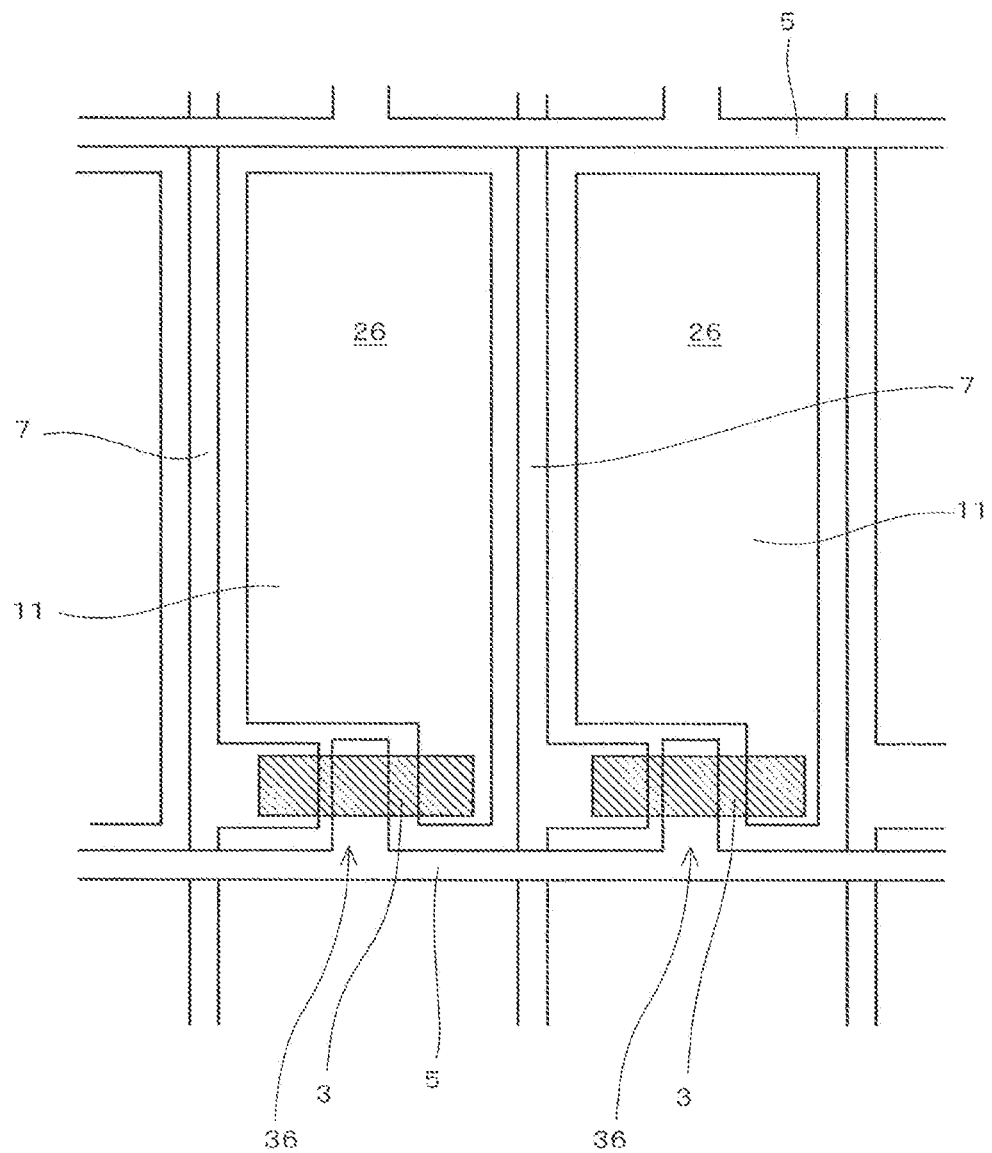
FIG. 6 is a partial plan view showing the pixel regions on the driver substrate of the LCD device according to the first embodiment of the present invention.
Figure 7:
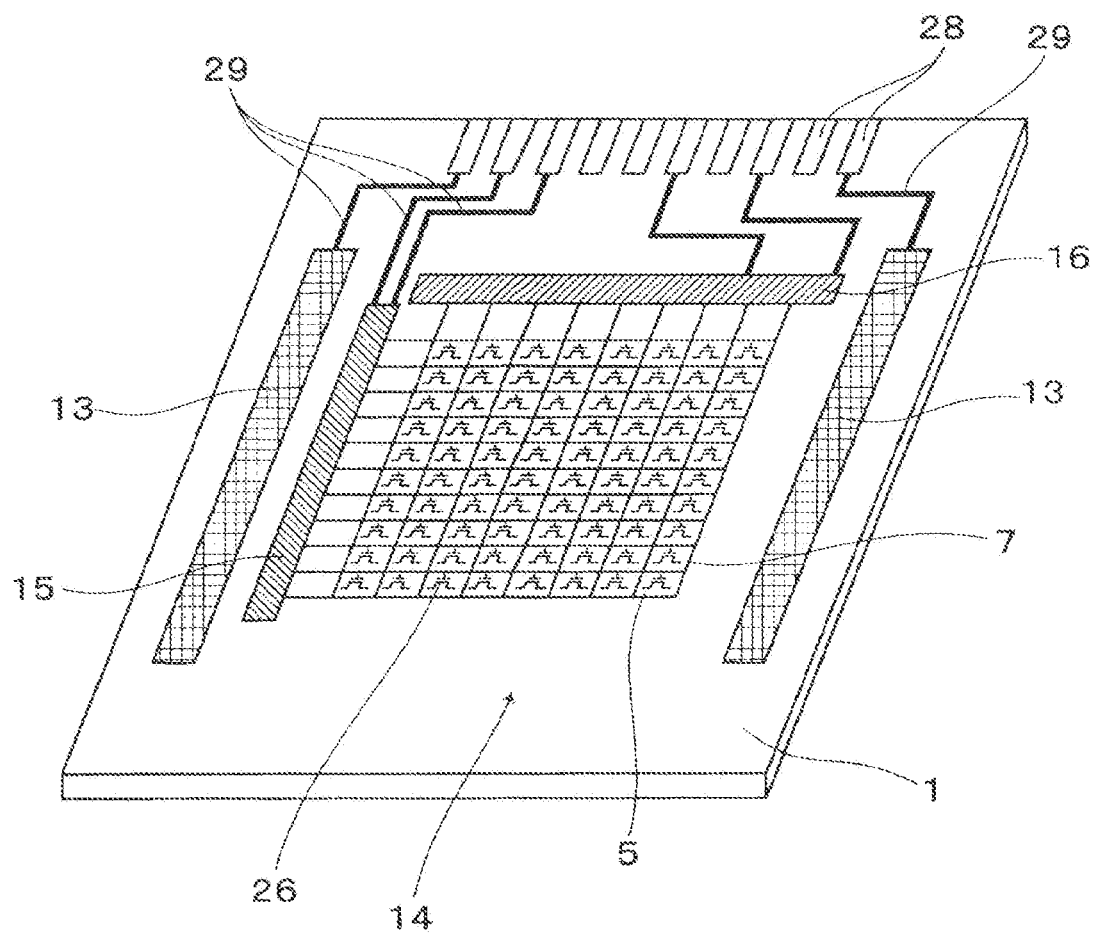
FIG. 7 is a perspective view showing the structure of the driver substrate of the LCD device according to the first embodiment of the present invention.
Figure 8:
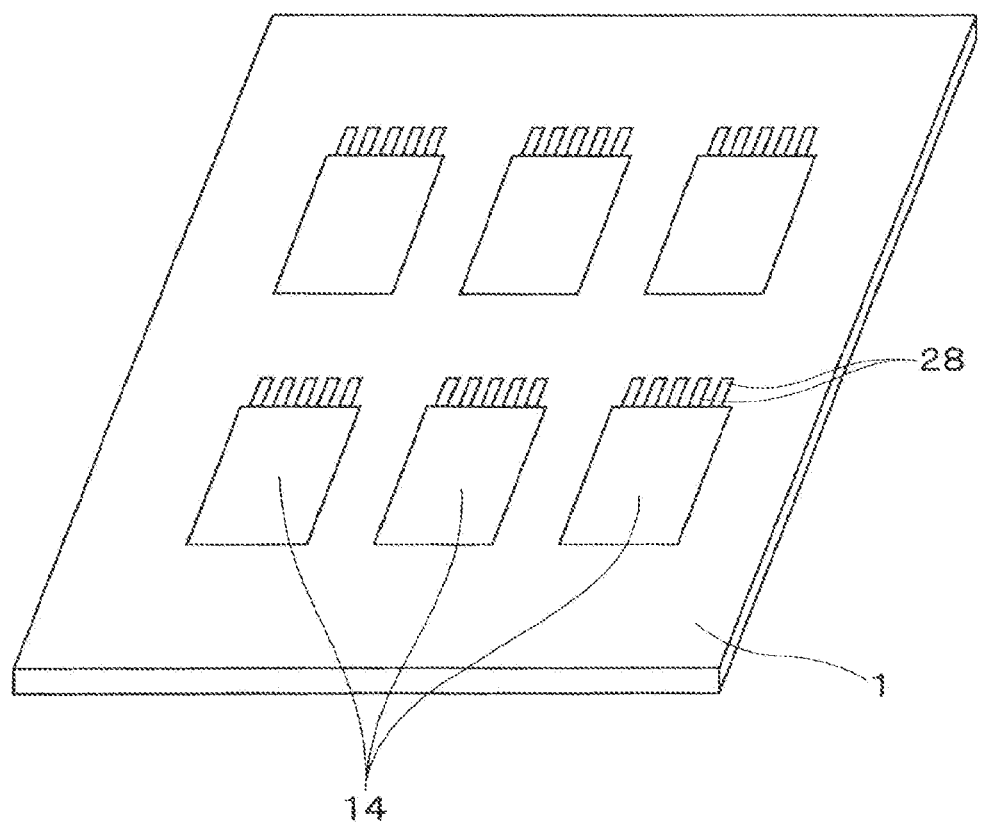
FIG. 8 is a perspective view showing the state of the driver substrates formed on the glass plate for the LCD device according to the first embodiment of the present invention prior to the dividing process.

Next, a method of fabricating the LCD device according to the first embodiment shown in FIGS. 2 and 3 will be explained below with reference to FIGS. 5A to 5J and FIGS. 6 to 8. FIGS. 5A to 5J are partial cross-sectional views showing the process steps of this method, respectively. FIG. 6 is a partial plan view showing the pixel regions on the driver substrate 1. FIG. 7 is a perspective view showing the structure of the driver substrate 1. FIG. 8 is a perspective view showing the state of the driver substrates 1 formed by using a glass plate prior to dividing.

An underlying insulating film (e.g., a $SiO_2$ film) 2 is formed on a glass plate 1a for the driver substrate 1 and thereafter, an amorphous silicon film is grown on the insulating film 2. Laser light is irradiated to the amorphous silicon film for annealing, thereby converting it to a polysilicon film 3a, as shown in FIG. 5A. Subsequently, the polysilicon film 3a is patterned by known photolithography and etching processes, thereby forming island regions 3 made of polysilicon, as shown in FIG. 5B.

Figure 5C:
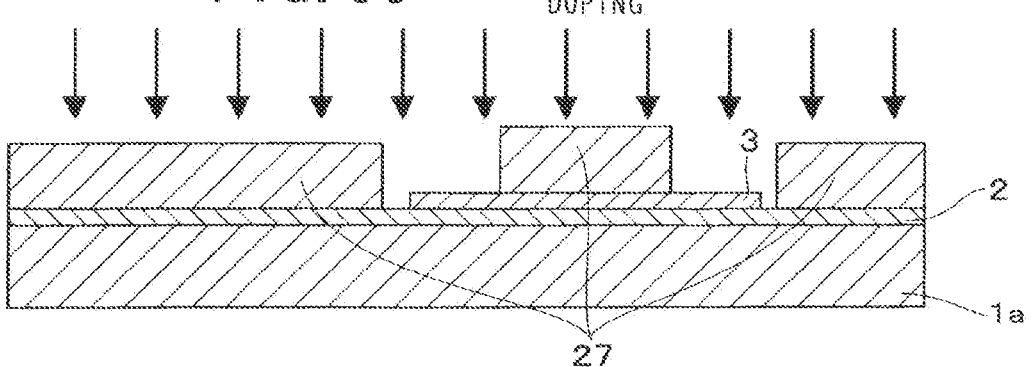
Figure 5D:
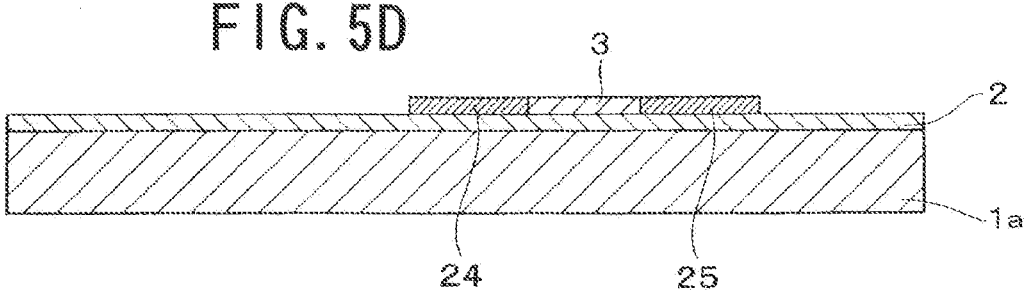

Following this, a patterned photoresist film 27 is formed on the glass plate 1a on which the polysilicon island regions 3 have been formed and then, predetermined ions as a dopant are selectively doped into the predetermined parts of the respective island regions 3, as shown in FIG. 5C. After the doping is completed, the photoresist film 27 is removed. Thus, a source region 24 and a drain region 25 are formed at each side of each of the island regions 3 at an interval, as shown in FIG. 5D. The part of the region 3 sandwiched by the source region 24 and the drain region 25 is a channel region.

Figure 5E:
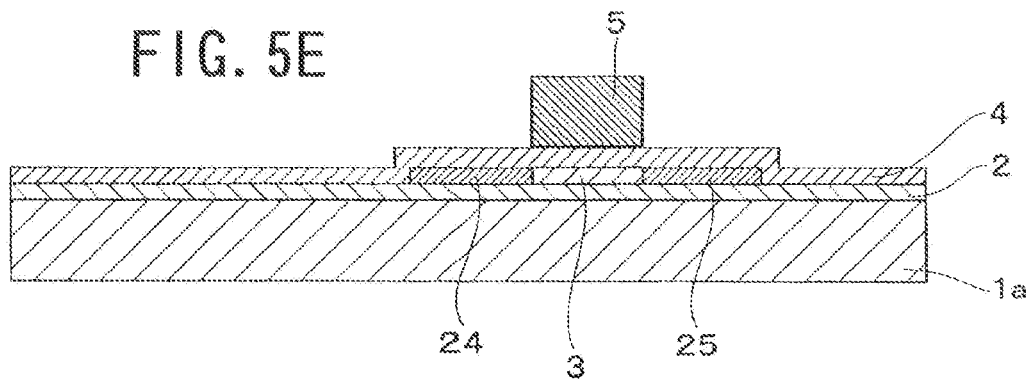

Next, a gate oxide film (e.g., a $SiO_2$ film) 4 is formed on the underlying insulating film 2 to cover all the island regions 3. Then, a conductive film (e.g., a Cr film) is formed on the gate oxide film 4. The conductive film is patterned by known photolithography and etching processes, thereby forming gate electrodes/lines 5 in the predetermined areas on the gate oxide film 4, as shown in FIG. 5E. Each of the gate electrodes/lines 5 is a combined element of the gate electrode and the corresponding gate line. The gate oxide film 4 is formed to cover the whole surface of the glass plate 1a.

Figure 5F:
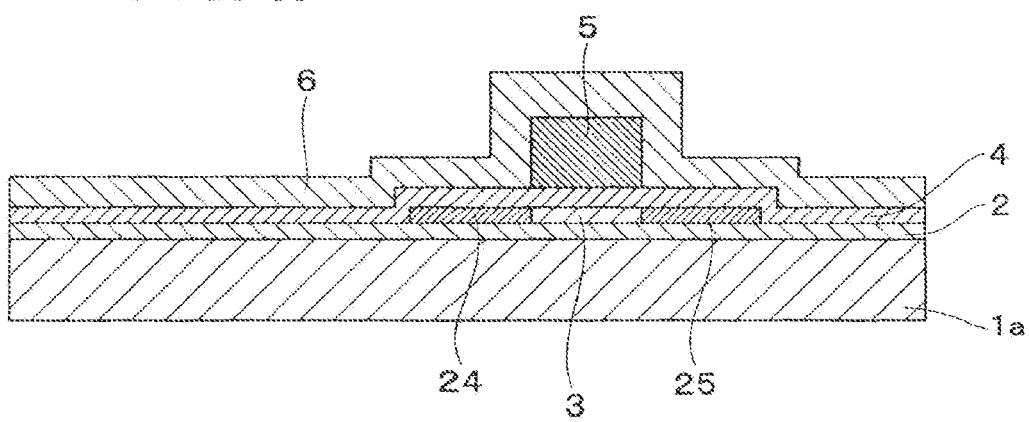
Figure 5G:
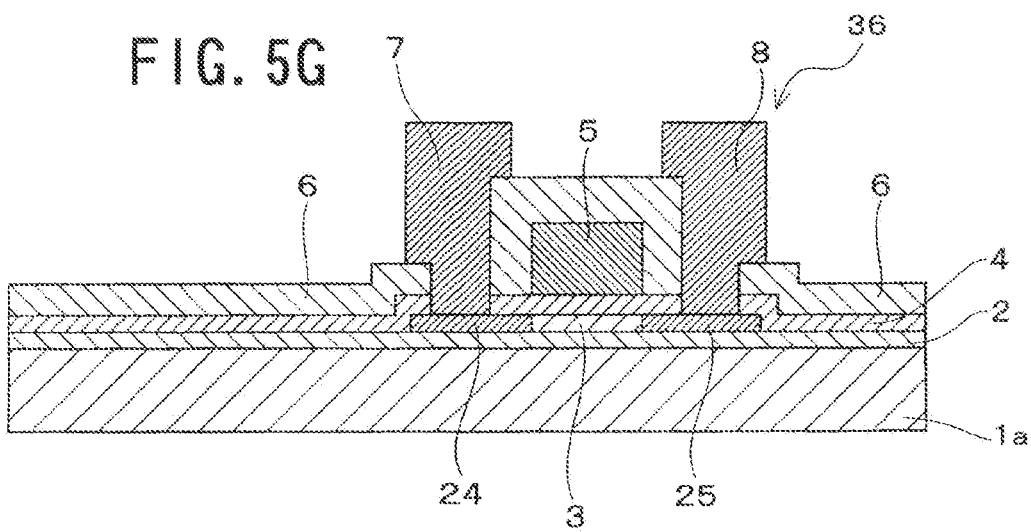

Next, a lower insulating film (e.g., a $SiO_2$ film) 6 is formed on the gate oxide film 4, thereby covering the gate electrodes/lines 5. The lower insulating film 6 is formed to cover the whole surface of the glass plate 1a, as shown in FIG. 5F. Subsequently, contact holes are formed at predetermined positions of the lower insulating film 6 and the gate oxide film 4 and then, a conductive film (e.g., a Cr film) is formed on the lower insulating film 6. The conductive film is patterned by known lithography and etching processes, resulting in source electrodes/lines 7 and drain electrodes 8, as shown in FIG. 5G. The source electrodes/lines 7 and the drain electrodes 8 thus formed are electrically connected to the corresponding source regions 24 and the corresponding drain regions 25, respectively. Each of the source electrodes/lines 7 is a combined element of the source electrode and the corresponding source line. At this stage, TFTs 36 are completed.

Figure 5H:
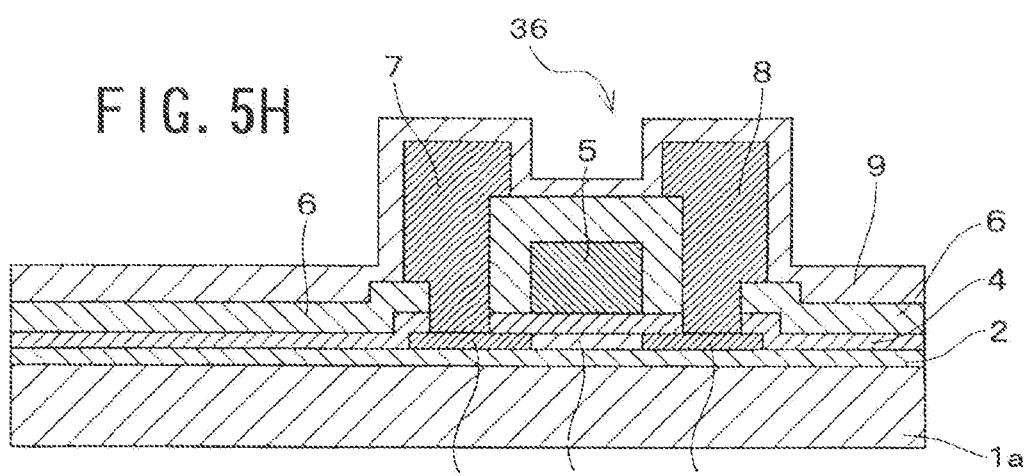
Figure 5I:
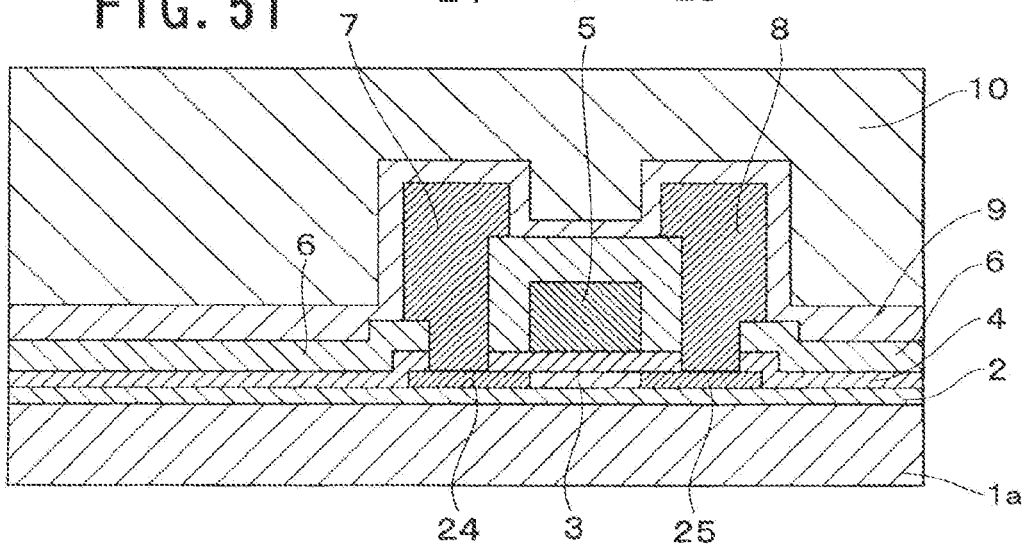

After the source electrodes/lines 7 and the drain electrodes 8 are formed in such a way as above, an interlayer insulating film 9 is formed over the whole surface of the glass plate 1a, as shown in FIG. 5H. Moreover, to planarize the surface irregularities, a planarization film 10 is formed on the interlayer insulating film 9, as shown in FIG. 5I. It is preferred that an inorganic dielectric film is used for the interlayer insulating film 9 in order that the film 9 may not react with the source electrodes/lines 7 and the drain electrodes 8, and that an organic resin having a stronger planarizing effect is used for the planarization film 10.

Figure 5J:
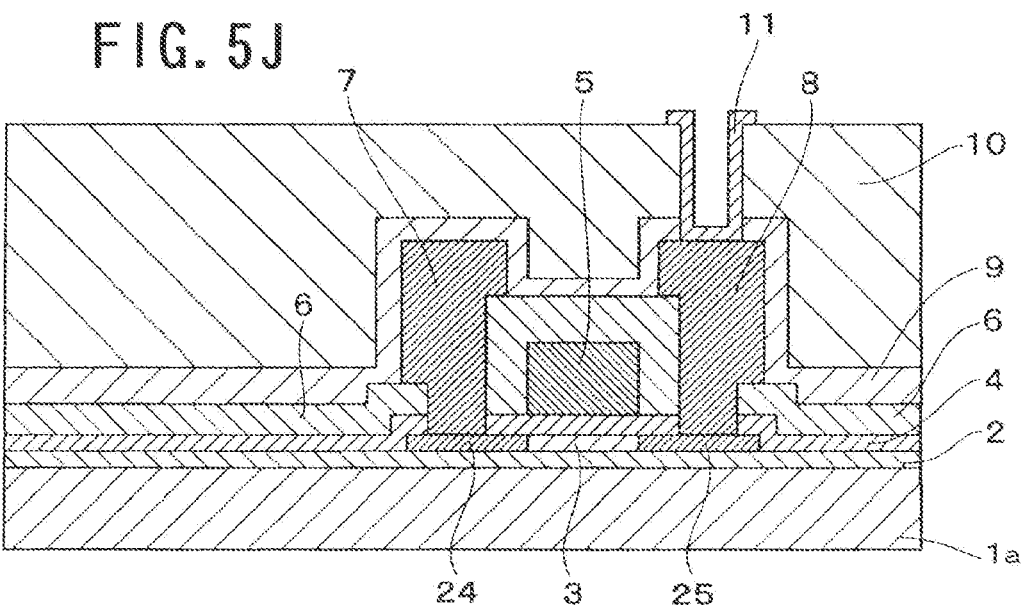

Contact holes that penetrate through the interlayer insulating film 9 and the planarization film 10 are respectively formed at the predetermined positions on the drain electrodes 8 and then, a transparent conductive film (e.g., an Indium Tin Oxide (ITO) film) is formed on the planarization film 10. Thereafter, the conductive film thus formed is patterned by known photolithography and etching processes, thereby forming pixel electrodes 11 on the planarization film 10, as shown in FIG. 5J. The pixel electrodes 11 are electrically connected to the corresponding drain electrodes 8 by way of the corresponding contact holes, respectively. It is preferred that the pixel electrodes 11 are made of a material having transparency to visible light.

Finally, the alignment film 12a (see FIG. 3) is formed on the planarization film 10 to cover the pixel electrodes 11 and then, a predetermined aligning treatment is applied to the surface of the film 12a, thereby making the liquid-crystal molecules contacted with the surface of the film 12a aligned to the predetermined direction. In this way, the driver substrate 1 is obtained.

The plan view of the pixel regions 26 formed in such the manner as described above is shown in FIG. 6. Each of the gate electrodes/lines 5 is extended along the lateral direction of FIG. 6. Each of the source electrodes/lines 7 is extended along the vertical direction of FIG. 6. Each of the pixel regions 26 is a region defined by the two adjoining gate electrodes/lines 5 and the two adjoining source electrodes/lines 7. The pixel electrodes 26 are arranged in a matrix array on the glass plate 1a. Each of the pixel regions 26 includes one of the pixel electrodes 11 and one of the TFTs 36. Here, the TFT 36, the pixel electrode 11, and so on located within each of the pixel regions 26 are termed in the lump a set of "driver substrate-side liquid-crystal driving elements 14". To make it easier to understand, only the main elements are shown in FIG. 6.

A plurality of sets of the driver substrate-side liquid-crystal driving elements 14 (in other words, the pixel regions 26) are arranged in a matrix array in the display region, as shown in FIG. 7. These sets of the driver substrate-side liquid-crystal driving elements 14 are electrically connected to a gate line driving circuit 15 placed outside the display region (i.e., placed in the non-display region) by way of the corresponding gate electrodes/lines 5 and at the same time, they are electrically connected to a source line driving circuit 16 placed outside the display region (i.e., placed in the non-display region) by way of the corresponding source electrodes/lines 7. The gate line driving circuit 15 and the source line driving circuit 16 are respectively formed by the TFTs 36 in the same manner as described above.

When the driver substrate 1 is coupled to the opposite substrate 18, the sealing material 30 is formed on the planarization film 10 of the driver substrate 1 in such a way as to have a predetermined pattern. In addition, transfer electrodes 13 for electrical interconnection with the opposite substrate 18 are formed on the planarization film 10 near the end portions of the substrate 18. It is preferred that the transfer electrodes 13 are made of the same material as the pixel electrodes 11 in the step of forming the pixel electrodes 11. The transfer electrodes 13 may be omitted according to the type of the liquid-crystal driving method.

The gate line driving circuit 15, the source line driving circuit 16, and the transfer electrodes 13 are electrically connected to corresponding external connection terminals 28 formed on one edge of the driver substrate 1 by way of external connection lines 29. The gate line driving circuit 15, the source line driving circuit 16, and the transfer electrodes 13 (in other words, the LCD device according to the first embodiment) are electrically connected to an external circuit (not shown) with the external connection terminals 28.

In the above-described explanation, to simplify the explanation and the drawings, it is illustrated such that the only one structure of the driver substrate 1 shown in FIG. 7 is formed on the glass plate 1a. However, a plurality of the structures of the driver substrate 1 is simultaneously formed on the glass plate 1a in the practical fabrication processes, as shown in FIG. 8. Therefore, a plurality of the structures of FIG. 7 including the set of driver substrate-side liquid-crystal driving elements 14, the external connection terminals 28, and so on are formed on the single glass plate 1a through the above-described process steps.

Figure 11:
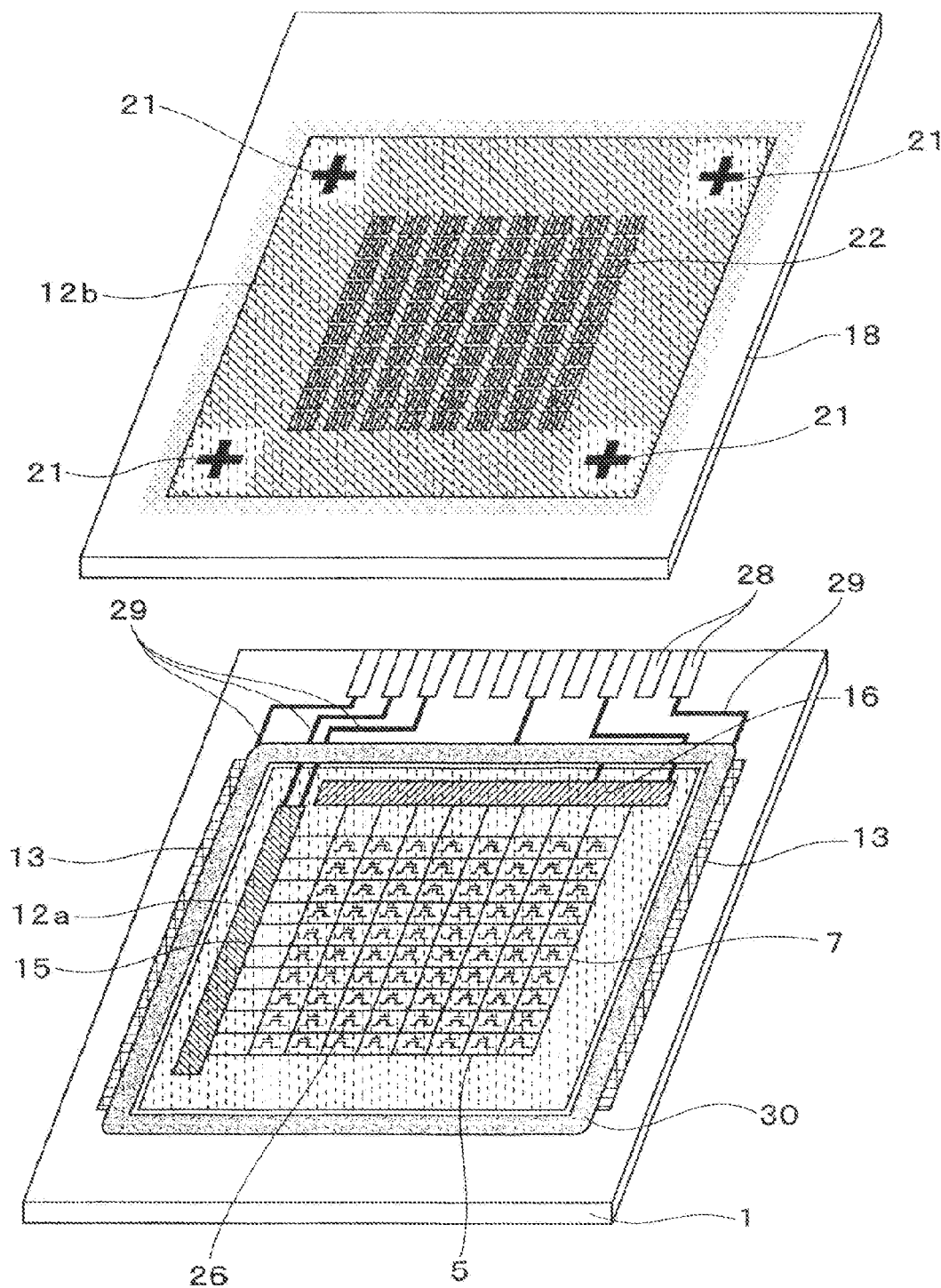
FIG. 11 is a perspective view showing the state where the driver substrate and the opposite substrates of the LCD device according to the first embodiment of the present invention are arranged before coupling.

Thereafter, the alignment film 12a is formed by printing on the planarization film 10 of the driver substrate 1 (see FIG. 11). The alignment film 12a is formed to cover not only the inside of the display region (which is an approximately rectangular region defined by the entirety of the pixel regions 26 arranged in a matrix array) but almost all the non-display region (which is an approximately rectangular ring-shaped region) sandwiched by the outer edges of the said display region and the inner edges of the sealing material 30, as clearly shown in FIG. 11. Therefore, the areas corresponding to the markers 21 on the opposite substrate 18 also are covered with the alignment film 12a. In addition, in order not to make a contact between the alignment film 12a and the sealing material 30, small clearances are formed between the outer edges of the alignment film 12a and the inner edges of the sealing material 30.

Here, the alignment film 12a is formed to cover almost all the non-display region. However, the alignment film 12a may be formed to partially cover the areas only corresponding to the markers 21 in the non-display region.

Subsequently, an aligning treatment for aligning the liquid-crystal molecules to a predetermined direction is applied to the surface of the alignment film 12a. A treatment that rubs the surface of the alignment film 12a using polyimide, a treatment that uses ion beams, or the like may be used for the aligning treatment.

Next, a method of fabricating the opposite substrate 18, which is coupled with the driver substrate 1 in such a way as to be opposed thereto, will be explained below with reference to FIGS. 9A to 9E. FIGS. 9A to 9E are partial cross-sectional views showing the process steps of the method of fabricating the opposite substrate 18, respectively.

Figure 9A:
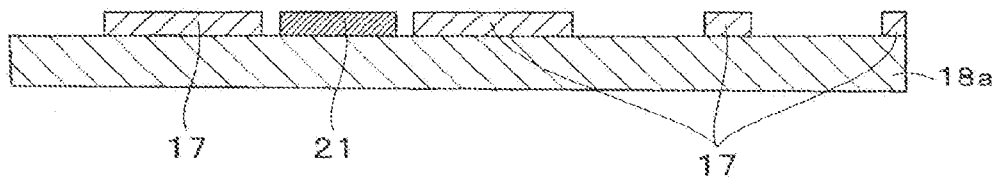
FIGS. 9A to 9E are partial cross-sectional views of the vicinity of one of the markers, which show the process steps of a method of fabricating the opposite substrate of the LCD device according to the first embodiment of the present invention, respectively.

First, as shown in FIG. 9A, a black matrix 17 is formed on a glass plate 18a for the opposite substrate 18 to have a predetermined pattern. The black matrix 17 is placed in the areas opposite to the driver substrate-side liquid-crystal driving elements 14, the gate line driving circuit 15, the source line driving circuit 16, the external connection lines 29, and so on, which are located in the non-display region of the driver substrate 1 in the coupling operation of the opposite and driver substrates 18 and 1.

The black matrix 17 is formed by patterning a metal film such as aluminum (Al), chromium (Cr), or the like through which visible light does not penetrate (i.e., a metal film having a light-shielding property) by known photolithography and etching processes. Therefore, the four markers 21 can be formed on the glass plate 18a simultaneously with the black matrix 17 by using the same metallic material having a light-shielding property as that of the black matrix 17.

The positions of the respective markers 21 are determined at the positions which are opposite (which correspond) to the non-display region of the driver substrate 1 and which are not covered with the sealing material 30 for adhesion between the driver and opposite substrates 1 and 18. Here, as shown in FIG. 2, the markers 21 are arranged in the rectangular ring-shaped non-display region which is sandwiched by the outer edges of the display region and the inner edges of the sealing material 30, where the markers 21 are respectively assigned to the vicinities of the four corners of the non-display region.

Each marker 21 may have any plan shape if the optical element 32 can be placed at a predetermined position on the opposite substrate 18 by recognizing the marker 21 with eyes, a CCD camera, or the like. For example, if each marker 21 is formed to have a cruciform (cross-shaped) plan shape, as shown in FIG. 2 and then, the four markers 21 are arranged in such a way that the respective centers (intersections) of the cruciform markers 21 coincide with the corresponding positions on the opposite substrate 18, these markers 21 can be used as the reference in the placement or attachment operation of the optical element 32. It is needless to say that the plan shape of each marker 21 may be any other shape such as linear (I-shaped), circular (O-shaped), or the like.

Since the markers 21 are used for placement or positioning of the optical element 32 on the opposite substrate 18 in its attachment operation, it is preferred that the count of the markers 21 is set at least two.

Figure 9B:
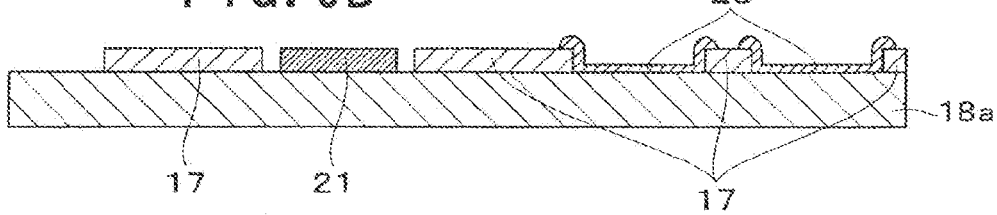

Next, as shown in FIG. 9B, three color layers 20 of red (R), green (G), and blue (B) having predetermined patterns are formed in the regions (which are placed in the display region) opposite to the pixel electrodes 11 on the driver substrate 1 as a color filter by known photolithography and etching processes.

Figure 9C:
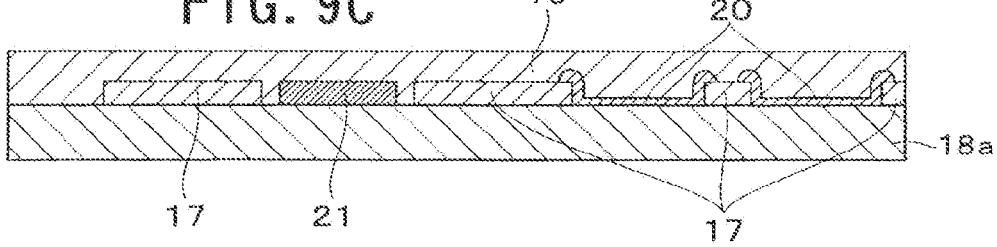

Subsequently, as shown in FIG. 9C, to relax the irregularities (i.e., projections and depressions) generated by the thickness differences among the respective color layers 20 and the black matrix 17 (and the markers 21), an overcoat film 19 is formed to cover the color layers 20 and the black matrix 17. The overcoat film 19 is formed to cover the whole surface of the opposite substrate 18. It is preferred that the overcoat film 19 is made of an organic resin having a stronger planarization effect, or the like; however, the overcoat film 19 may be omitted according to the characteristics of the LCD device. The surface of the overcoat film 19 is flat.

Figure 9D:
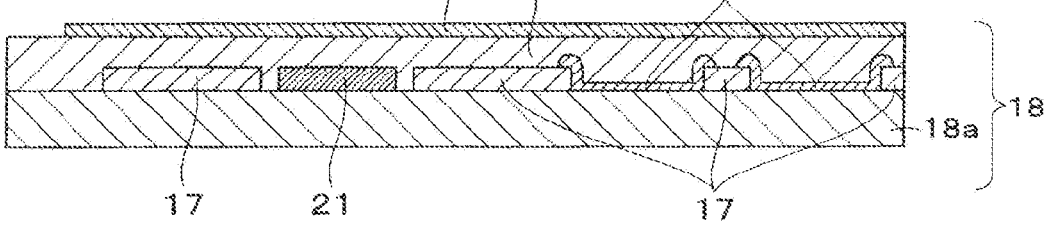

Following this, as shown in FIG. 9D, an opposite electrode 23 is formed on the overcoat film 19. The opposite electrode 23, which is commonly used for all the pixel electrodes 11, is formed to cover the area extending from the region (i.e., the display region) corresponding to all the pixel electrodes 11 on the driver substrate 1 to the region corresponding to the transfer electrodes 13 on the driver substrate 1. In this way, the opposite substrate 18 is completed.

The opposite electrode 23, the color layers 20, and the black matrix 17 formed on the opposite substrate 18 constitute a set of opposite substrate-side liquid-crystal driving elements 22, which are opposite to a corresponding one of the sets of the driver substrate-side liquid-crystal driving elements 14.

Figure 10:
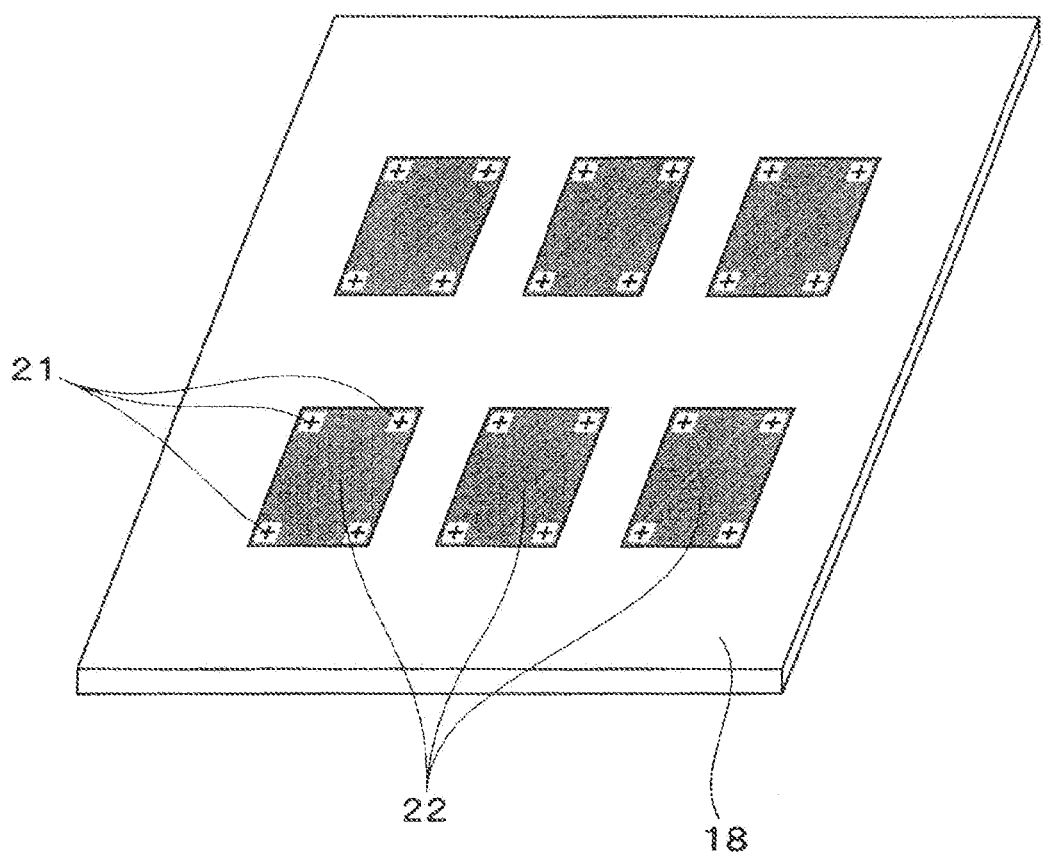
FIG. 10 is a perspective view showing the state of the opposite substrates formed on the glass plate for the LCD device according to the first embodiment of the present invention prior to the dividing process.

In the above-described explanation, only one structure of the opposite substrate 18 shown in FIG. 9D is formed on the glass plate 18a. However, a plurality of the structures of the opposite substrate 18 is simultaneously formed on the glass plate 18a in the practical fabrication steps, as shown in FIG. 10. Therefore, a plurality of the structures of the opposite substrate 18 of FIG. 9D including the set of opposite substrate-side liquid-crystal driving elements 22 is formed on the single glass plate 18a through the above-described process steps.

Figure 9E:
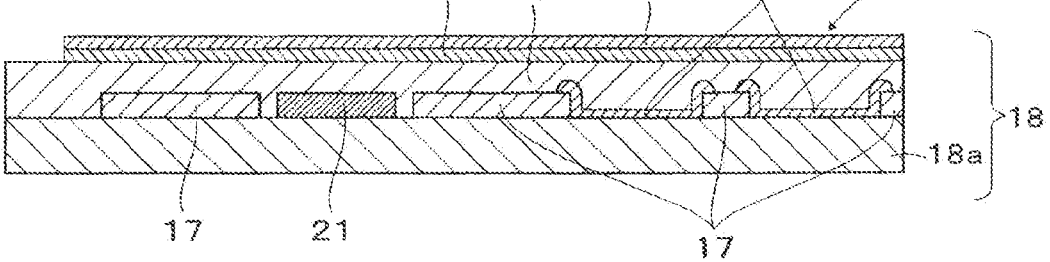

On the opposite substrate 18 thus fabricated, the alignment film 12b is formed to cover the opposite electrode 23, as shown in FIG. 9E and FIG. 11. At this time, the alignment film 12b is superposed on the alignment film 12a on the driver substrate 1 almost correctly and therefore, the alignment film 12b is overlapped not only with the display region but also with the markers 21. Thereafter, in the same manner as the driver substrate 1, an aligning treatment for aligning the liquid-crystal molecules to a predetermined direction is applied to the surface of the alignment film 12b.

In addition, here, the alignment film 12b is formed to cover almost all the non-display region. However, the alignment film 12b may be formed to cover locally the markers 21 only.

Following this, the driver and opposite substrates 1 and 18 are coupled together with the sealing material 30 in the following way.

Specifically, as shown in FIG. 11, the sealing material 30 is coated on the inner surface of the driver substrate 1 (on the surface of the planarization film 10 in FIG. 5J) to have a rectangular ring shape along the outer edges of the display region on the outside of the said display region, thereby defining the space in which the liquid crystal 35 is enclosed. When the liquid crystal 35 is injected into this space utilizing capillary action, the sealing material 30 is coated in such a way as to be open at the position for the injection hole and then, the driver and opposite substrates 1 and 18 are superposed. On the other hand, when the liquid crystal 35 is injected into this space by dropping, the liquid crystal 35 is dropped in this space on the driver substrate 1 before coupling and thereafter, the driver and opposite substrates 1 and 18 are superposed. Subsequently, for example, ultraviolet (UV) light is irradiated to the sealing material 30 for curing. Thus, the sealing material 30 is cured and at the same time, the driver and opposite substrates 1 and 18 are joined together by the cured material 30, where the liquid crystal 35 is enclosed in the space between the substrates 1 and 18 thus joined. When the liquid crystal 35 has been injected by utilizing capillary action, the injection hole for the liquid crystal 35 is closed. When the liquid crystal 35 has been injected by dropping, the injection hole has not been formed and therefore, the process of closing the injection hole is unnecessary. In this way, the LCD panel 34 as shown in FIGS. 2 and 3 is obtained.

In the practical fabrication processes, a plurality of LCD panel structures is simultaneously fabricated by the driver and opposite substrates 1 and 18, as shown in FIGS. 8 and 10. Therefore, after coupling and unifying the driver and opposite substrates 1 and 18, these two substrates 1 and 18 thus coupled and unified are divided by cutting into the individual LCD panel structures. As a result, a plurality of the LCD panels 34 is fabricated simultaneously, each of which includes the set of the driver substrate-side liquid-crystal driving elements 14 and the set of the opposite substrate-side liquid-crystal driving elements 22.

Figure 12:
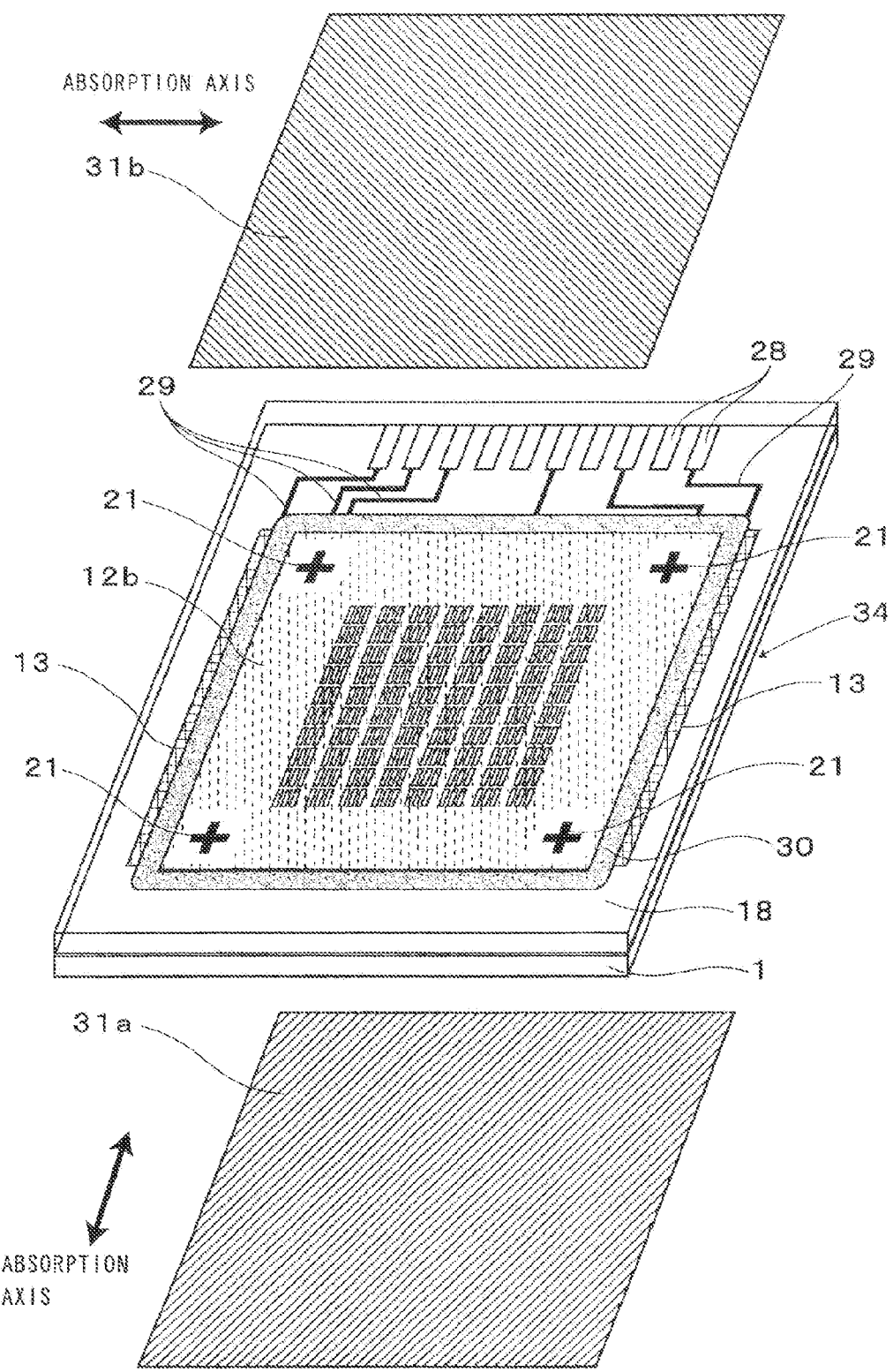
FIG. 12 is a perspective view showing the state where the driver substrate and the opposite substrate of the LCD device according to the first embodiment of the present invention are coupled, wherein polarizer plates are not yet attached thereto.

Thereafter, as shown in FIG. 12, the polarizer plates 31a and 31b are attached to the outer surfaces of the driver and opposite substrates 1 and 18, respectively. At this time, the absorption axes of the polarizer plates 31a and 31b are adjusted to intersect at right angles.

With the LCD panel 34 thus fabricated, the two alignment films 12a and 12b are overlapped with the four markers 21 and at the same time, the whole surfaces of the alignment films 12a and 12b are subjected to the predetermined aligning treatment. Therefore, the position and shape of the markers 21 can be differentiated clearly by way of the polarizer plates 31a and 31b whose absorption axes have been adjusted to intersect at right angles. Accordingly, as shown in FIG. 2, even after the polarizer plates 31a and 31b are attached to the outer surfaces of the driver and opposite substrates 1 and 18, respectively, the markers 21 can be recognized with eyes or the like. For this reason, if some markers (not shown, which are the same as or similar to the markers 21) are formed on the optical element 32, desired placement and attachment between the LCD panel 34 (i.e., the driver and opposite substrates 1 and 18) and the optical element 32 can be achieved with high positional accuracy by matching or aligning the markers on the optical element 32 to the markers 21 on the LCD panel 34.

With the LCD device according to the first embodiment, as described above, the LCD panel 34 comprises the driver substrate 1 as the main substrate, the opposite substrate 18, and the liquid crystal 35 enclosed in the gap between the driver and opposite substrates 1 and 18. The polarizer plates 31a and 31b are attached to the substrates 1 and 18, respectively. The four markers 21 are formed on the opposite substrate 18 at the positions overlapped with the polarizer plates 31a and 31b.

Moreover, the alignment films 12a and 12b are formed on the inner surfaces of the driver and opposite substrates 1 and 18, respectively, where the alignment films 12a and 12b are overlapped with the markers 21. Therefore, the alignment direction of the molecules of the liquid crystal 35 in the vicinities of the respective markers 21 is regulated to the same direction as that of the molecules of the liquid crystal 35 in the display region.

Further, since the LCD device according to the first embodiment is designed to operate in the normally white mode, light penetrates through the LCD panel 34 by way of the two polarizer plates 31a and 31b even when no voltage is applied to the liquid crystal 35. Because the markers 21 are overlapped with the polarizer plates 31a and 31b and the alignment films 12a and 12b, light can penetrate through the panel 34 even in the vicinities of the respective markers 21.

In this way, by utilizing the fact that light penetrates through the region where the alignment films 12a and 12b are placed even if an ON voltage is not applied in the normally white mode, the alignment films 12a and 12b are placed to cover the vicinities of the markers 21 also, thereby allowing light to pass through the panel 34 in the vicinities of the markers 21. Therefore, the markers 21 can be visually recognized, in other words, the markers 21 can be read with eyes, a CCD camera, or the like. Accordingly, the markers 21 can be used as a reference in the attachment operation of the optical element 32 to the LCD panel 34 and as a result, the optical element 32 can be attached to the polarizer plate 31b with high positional accuracy.

Moreover, it is sufficient that the alignment direction of the molecules of the liquid crystal 35 is regulated in the vicinities of the markers 21 by the alignment films 12a and 12b serving as the alignment direction regulators, thereby allowing light to pass through the driver and opposite substrates 1 and 18. Moreover, such the alignment direction regulators as above can be easily realized by using the alignment films 12a and 12b included in the LCD panel 34. Accordingly, the enlargement of the picture-frame region (in other words, the non-display region) due to the formation of the markers 21 on the LCD panel 34 (i.e., the driver and opposite substrates 1 and 18), and the increase of the fabrication cost can be avoided or minimized.

Furthermore, with the method of fabricating the LCD device according to the first embodiment, the markers 21 are formed on the inner surface of the opposite substrate 18 in the step of forming the black matrix 17 using the same material with the light-shielding property as the black matrix 17. The markers 21 are covered with the alignment film 12b located on the opposite substrate 18, where the predetermined aligning treatment has been applied to the alignment film 12b. The markers 21 are positioned in such a way as to overlap with the polarizer plates 31a and 31b that are placed respectively on the driver and opposite substrates 1 and 18. The optical element 32 is attached to the LCD panel 34 on the side of the opposite substrate 18 while reading the markers 21. Accordingly, the LCD device according to the first embodiment having the optical element 32 attached to the panel 34 can be obtained.

Figure 13:
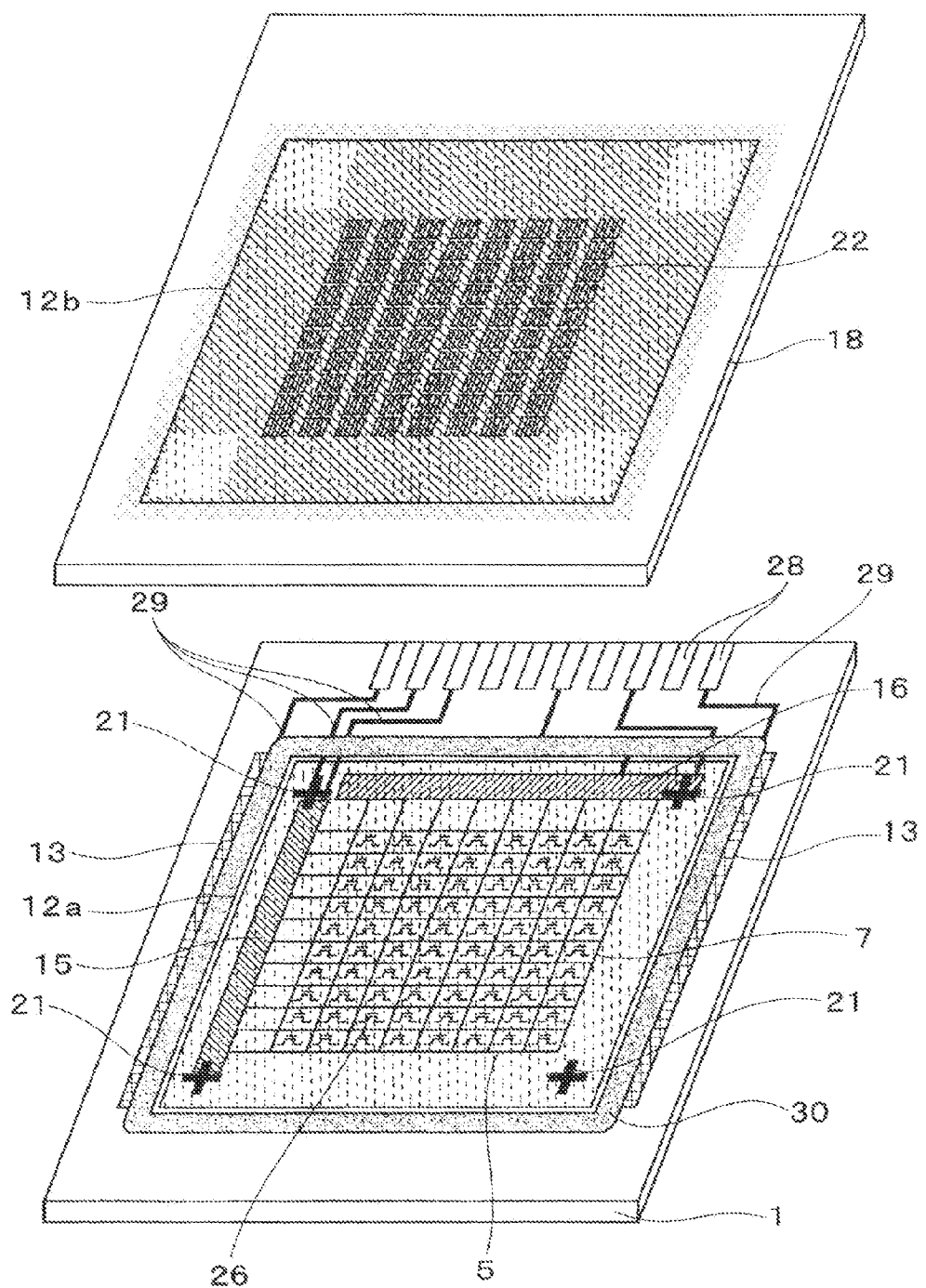
FIG. 13 is a similar view to FIG. 11, which shows the state where the markers are arranged on the driver substrate in the LCD device according to the first embodiment of the present invention.

In addition, the markers 21 are formed on the opposite substrate 18 in the first embodiment; however, the markers 21 may be formed on the driver substrate 1, as shown in FIG. 13. In the variation of the first embodiment of FIG. 13, similar to the case of FIG. 11, the markers 21 are formed in the non-display region which is formed in the inside of the sealing material 30, where part of the markers 21 are overlapped with the gate line driving circuit 15 or the source line driving circuit 16. In this variation, it is preferred that the markers 21 are formed simultaneously with the formation of the gate electrodes/lines 5, the source electrodes/lines 7, or the transfer electrodes 13. This is to avoid the increase of the process steps due to the formation of the markers 21. It is preferred that the black matrix 17 on the opposite substrate 18 is partially removed at the positions to be opposite to the markers 21. This is to enhance the transparency at the said positions to be opposite to the markers 21.

When the markers 21 are formed simultaneously with the formation of the gate electrodes/lines 5, it is preferred that the markers 21 are formed by the same conductive material having the light-shielding property as the gate electrodes/lines 5, and that the markers 21 are placed on the gate oxide film 4 (see FIG. 5E).

When the markers 21 are formed simultaneously with the formation of the source electrodes/lines 7, it is preferred that the markers 21 are formed by the same conductive material having the light-shielding property as the source electrodes/lines 7, and that the markers 21 are placed on the lower insulating film 6 (see FIG. 5G).

When the markers 21 are formed simultaneously with the formation of the transfer electrodes 13, it is preferred that the markers 21 are formed by the same conductive material having the light-shielding property as the transfer electrodes 13, and that the markers 21 are placed on the planarization film 10 (see FIG. 5J).

Second Embodiment

Figure 14:
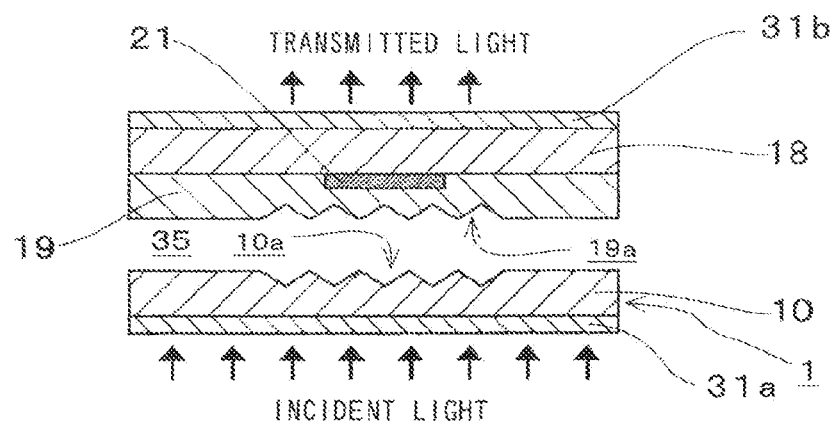
FIG. 14 is a partial cross-sectional view of the vicinity of one of the markers of a LCD device according to a second embodiment of the present invention.
Figure 15:
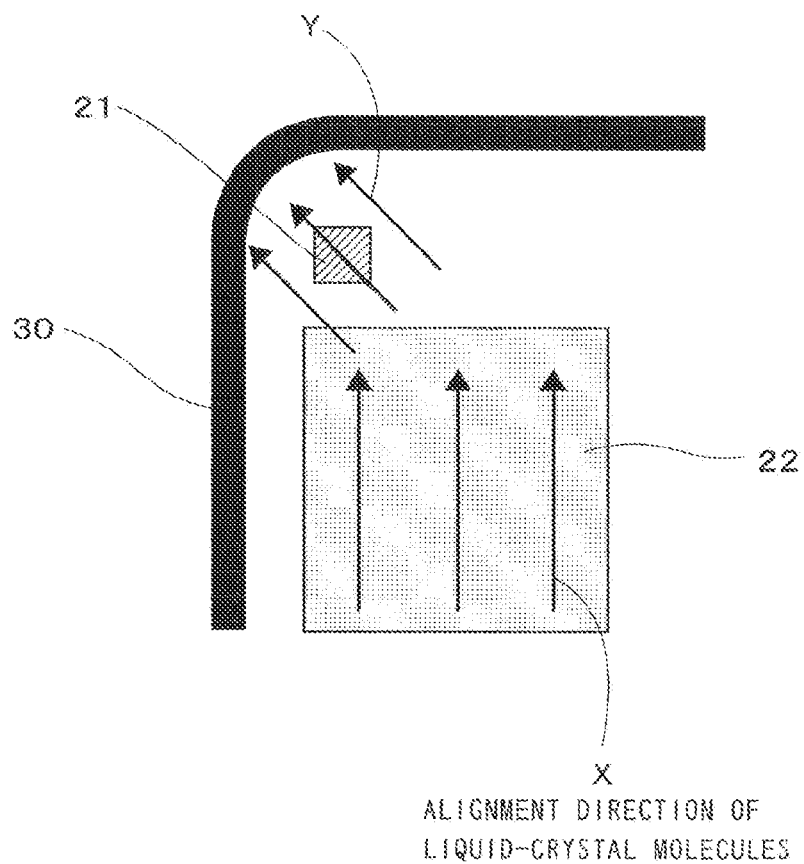
FIG. 15 is an explanatory partial plan view of the vicinity of one of the markers of the LCD device according to the second embodiment of the present invention.

FIGS. 14 and 15 show the LCD panel incorporated into a LCD device according to a second embodiment of the invention. Unlike the above-described first embodiment, this LCD device is designed to operate in the normally black mode. FIG. 14 is a partial cross-sectional view showing the structure of the LCD panel 34 in the vicinity of one of the markers 21, and FIG. 15 is an explanatory partial plan view showing the alignment state of the liquid-crystal molecules in the vicinity of the said marker 21 and the display region. The markers 21 used in the second embodiment are the same as those used in the first embodiment.

With the LCD device designed to operate in the normally black mode, the markers 21 are unable to be recognized visually even if the alignment direction of the molecules of the liquid crystal 35 in the vicinities of the markers 21 is equalized to that of the molecules of the liquid crystal 35 in the display region. This is because light does not penetrate through the LCD panel 34 in the state where an ON voltage is not applied to the molecules.

For example, with the LCD device of the In-Plane Switching (IPS) type, the alignment direction of the molecules of the liquid crystal 35 is the same as that of the absorption axis of the polarizer plate 31a or 31b in the state where an ON voltage is not applied to the molecules. Therefore, the polarized light that has passed through the polarizer plate 31a located on the driver substrate 1 is almost absorbed by the polarizer plate 31b located on the opposite substrate 18. Accordingly, the said polarized light is unable to penetrate through the polarizing plate 31b in the state where an ON voltage is not applied to the molecules.

With the LCD device of the Vertical Aligned (VA) type, the molecules of the liquid crystal 35 are aligned along a direction perpendicular to the driver and opposite substrates 1 and 18, where the polarization direction of the incident light does not change in the liquid crystal 35. Therefore, similar to the case of the IPS type, the polarized light that has passed through the polarizer plate 31a located on the driver substrate 1 is unable to penetrate through the polarizer plate 31b located on the opposite substrate 18 in the state where an ON voltage is not applied to the molecules.

As a result, to make it possible to recognize the markers 21 visually by way of the two polarizer plates 31a and 31b in the LCD device designed to operate in the normally black mode, it is required that the alignment direction of the molecules of the liquid crystal 35 in the vicinities of the markers 21 is locally or selectively different from that of the molecules of the liquid crystal 35 in the display region. To meet this requirement, in the second embodiment, a plurality of parallel recesses (or protrusions) 10a and 19a are selectively formed as the alignment direction regulators in the vicinities of the markers 21 on the planarization film 10 of the driver substrate 1 and the overcoat film 19 of the opposite substrate 18, respectively. This is to utilize the property or nature that the molecules of the liquid crystal 35 are likely to be aligned along the recesses formed by rubbing treatment on the surfaces of the alignment films 12a and 12b.

In FIG. 14, the alignment films 12a and 12b are not shown. This is because, in this second embodiment, similar to popular LCD panels, the alignment films 12a and 12b are formed only in the inside of the display region and therefore, the alignment films 12a and 12b do not appear in the non-display region where the markers 21 are formed. This point is unlike the above-described first embodiment. For this reason, the recesses 10a are formed on the surface of the planarization film 10 in contact with the liquid-crystal molecules on the side of the driver substrate 1, and the recesses 19a are formed on the surface of the overcoat film 19 in contact with the liquid-crystal molecules on the side of the opposite substrate 18.

As shown in FIG. 15, the recesses 10a on the planarization film 10 and the recesses 19a on the overcoat film 19 are provided only in the vicinities of the markers 21. Therefore, the liquid-crystal molecules are contacted with the recesses 10a on the planarization film 10 and the recesses 19a on the overcoat film 19 in the said vicinities. As a result, the liquid-crystal molecules are locally aligned along the Y direction due to the action of the recesses 10a and 19a. On the other hand, in the vicinities of the opposite substrate-side liquid-crystal driving elements 22 arranged in the display region, the alignment films 12a and 12b are respectively placed on the surfaces of the planarization film 10 and the overcoat film 19. Therefore, the liquid-crystal molecules are aligned along the X direction (which is different from the Y direction) due to the action of the alignment films 12a and 12b.

In the second embodiment of FIGS. 14 and 15, it is preferred that the alignment direction Y of the liquid-crystal molecules in the vicinities of the markers 21, which is generated by the recesses 10a and 19a, is deviated from the absorption axis of the polarizer plate 31a or 31b (i.e., the alignment direction X of the liquid-crystal molecules in the display region) at approximately 45°. This is because if the liquid-crystal molecules are being aligned along the said direction thus deviated, the polarization direction of the light that has passed through the polarizer plate 31a on the driver substrate 1 will change due to birefringence and as a result, this light will be able to pass through the polarizer plate 31b (which is intersected at right angles with the polarizer plate 31a) on the opposite substrate 18.

However, it is not always necessary that the angle difference between the Y and X directions is approximately 45°. This is because if the Y direction is not the same as the X direction, the light can pass through the polarizer plate 31b and the markers 21 can be visually recognized, although the images of the markers 21 are darker than that obtained when the angle difference is approximately 45°.

It is preferred that the recesses 10a (or protrusions) are formed on the planarization film 10 simultaneously with the formation of the contact holes that penetrate through the planarization film 10. The step of forming the recesses 19a (or protrusions) on the overcoat film 19 needs to be added.

With the LCD device according to the second embodiment shown in FIGS. 14 and 15, as described above, the displaying method is the normally black mode, and the parallel recesses 10a and 19a respectively formed on the planarization film 10 (which is formed by an organic film) and the overcoat film 19 in the vicinities of the markers 21 are adopted as the alignment direction regulators for regulating the alignment direction of the liquid-crystal molecules. Therefore, due to the action of the recesses 10a and 19a, the liquid-crystal molecules are aligned to the Y direction only in the vicinities of the markers 21, where the Y direction is different from the alignment direction X of the liquid-crystal molecules in the display region, thereby making the LCD panel 34 transparent locally in the vicinities of the markers 21. Accordingly, the markers 21 can be recognized visually in the state where a ON voltage is not applied even in the normally black mode.

In addition, the recesses 10a and 19a are respectively formed on both of the planarization film 10 and the overcoat film 19 in the second embodiment; however, the recesses may be formed on any one of the planarization film 10 and the overcoat film 19. In this case, the alignment of the liquid-crystal molecules to the Y direction will occur only near the surface of the planarization film 10 or the overcoat film 19. Since light penetrates through the LCD panel 34 in the vicinities of the markers 21 even in such a state as described here, the markers 21 can be recognized visually.

Moreover, in addition to the planarization film 10 and the overcoat film 19, an organic film for forming the recesses 10a or 19a (or protrusions) may be selectively formed near the markers 21, and similar recesses to the recesses 10a or 19a may be formed on the organic film.

Third Embodiment

Figure 16:
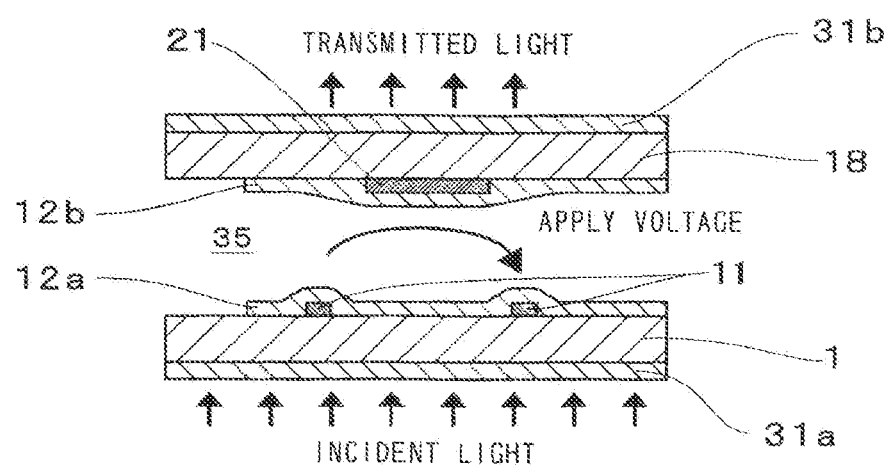
FIG. 16 is a partial cross-sectional view of the vicinity of one of the markers of a LCD device according to a third embodiment of the present invention.

FIG. 16 is a partial cross-sectional view of the vicinity of one of the markers 21, which shows the LCD panel 34 incorporated into a LCD device according to a third embodiment of the invention. The markers 21, which are the same as those used in the first embodiment, are located on the inner surface of the opposite substrate 18 (concretely speaking, on the surface of the overcoat film 19). Illustration of the sealing material 30 is omitted in FIG. 16.

The LCD panel 34 shown in FIG. 16, which is designed to operate in the normally black mode like the above-described second embodiment, comprises pairs of electrodes for applying a voltage to the liquid crystal in the vicinities of the markers 21, in other words, pairs of electrodes for regulating the alignment direction of the liquid-crystal molecules near the markers 21. These pairs of electrodes serve as the alignment direction regulators and therefore, they may be termed "alignment direction regulating electrodes". Here, an example where the pixel electrodes 11 incorporated into the LCD device of the IPS type are used as the alignment direction regulating electrodes is shown. This means that some of the pixel electrodes 11, which are usually formed only in the display region, are extended to the vicinities of the respective markers 21 located outside the display region (i.e., located in the non-display region).

The markers 21 and their corresponding pairs of alignment direction regulating electrodes (here, the pairs of pixel electrodes 11) are arranged in the non-display region; however, they are covered with the alignment films 12b and 12a, respectively, as shown in FIG. 16. This means that the alignment films 12b and 12a are formed to cover not only the display region but also the markers 21 and the pairs of alignment direction regulating electrodes, respectively. Since the markers 21 and the pairs of alignment direction regulating electrodes are respectively covered with the alignment films 12b and 12a, the alignment direction of the liquid-crystal molecules can be locally changed in the vicinities of the markers 21 by applying a voltage across the pairs of alignment direction regulating electrodes.

As the pair of alignment direction regulating electrodes, two of the pixel electrodes 11 which belong respectively to the two pixels adjoining to each other and which are extended to the non-display region are shown in FIG. 16. By applying an appropriate voltage across the two pixel electrodes 11, the liquid-crystal molecules are aligned to a direction approximately parallel to the driver and opposite substrates 1 and 18 in the vicinities of the markers 21, thereby creating a state where light can pass through the LCD panel 34. In addition, the pixel electrodes 11 serving as the alignment direction regulating electrodes are placed on the inner surface of the driver substrate 1 (concretely speaking, on the surface of the planarization film 10).

In this way, with the LCD device according to the third embodiment shown in FIG. 16, the pair of pixel electrodes 11 is provided as the alignment direction regulating electrodes near each of the markers 21. Therefore, even if the LCD device is designed to operate in the normally black mode, the markers 21 can be read by applying voltages across the respective pairs of pixel electrodes 11. Accordingly, the markers 21 can be recognized visually by way of the polarizer plate 31*b* on the opposite substrate 18 in the attachment operation of the optical element 32 to the LCD panel 34.

The shape of the alignment direction regulating electrodes (i.e., the pair of pixel electrodes 11) is not limited to that shown in FIG. 16, and this shape may be changed to any appropriate one according to the type of the LCD device such as the Field Fringe Switching (FFS) type and the VA type.

Although the pair of pixel electrodes 11 are used as the alignment direction regulating electrodes here, one of the pixel electrodes 11 and the opposite electrode 23 formed on the opposite substrate 18 may be used as the alignment direction regulating electrodes. Moreover, the alignment direction regulating electrodes may be provided exclusively without utilizing the pixel electrodes 11 and/or the opposite electrode 23. However, if so, the structure and fabrication processes will be complicated. Accordingly, it is preferred that existing electrodes such as the pixel electrodes 11 are utilized for the alignment direction regulating electrodes.

In the structure of FIG. 16, the markers 21 may be made of a material having high reflectance. If so, in a case where the LCD device is of the reflective or semi-transmissive type that is designed to operate in the normally black mode, the markers 21 can be recognized visually by using reflected light. The markers 21 may be provided on the driver substrate 1.

Fourth Embodiment

Figure 17A:
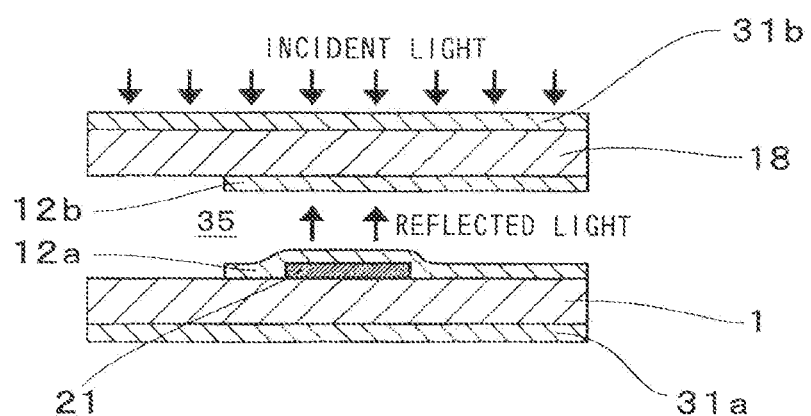
FIG. 17A is a partial cross-sectional view of the vicinity of one of the markers of a LCD device according to a fourth embodiment of the present invention.

FIG. 17A is a partial cross-sectional view of the vicinity of one of the markers 21, which shows the LCD panel 34 incorporated into a LCD device according to a fourth embodiment of the invention.

Each of the LCD devices according to the above-described first to third embodiments is of the transmissive type. Unlike this, the LCD device according to the fourth embodiment is of the reflective or semi-transmissive type, which shows a preferred example where one of the structures of the above-described first to third embodiments is applied to a reflective or semi-transmissive type LCD device. The device of the fourth embodiment is designed to operate in the normally white mode (see the first embodiment).

In the fourth embodiment, as shown in FIG. 17A, the markers 21 are made of the same material as that of the reflective electrodes or reflective plates (which will be termed the "reflecting members" below) used in the reflective or semi-transmissive type LCD device. Unlike the above-described first to third embodiments, the markers 21 are placed on the driver electrode 1 (concretely speaking, on the surface of the planarization film 10 or the non-illustrated transmission electrode). Illustration of the sealing material 30 is omitted in FIG. 17A.

The markers 21 arranged in the non-display region on the driver substrate 1 are covered with the alignment film 12*a*, which is similar to the above-described third embodiment. The regions on the opposite substrate 18 opposite to the respective markers 21 are covered with the alignment film 12*b*. This means that the alignment films 12*a* and 12*b* are respectively formed to cover not only the display region but also the regions opposite to the respective markers 21, which is similar to the above-described first embodiment. Since the markers 21 and the regions opposite to the said markers 21 are respectively covered with the alignment films 12*a* and 12*b*, the alignment direction of the liquid-crystal molecules in the vicinities of the markers 21 also is controlled ore regulated similar to the inside of the display region. As a result, similar to the inside of the display region, light can pass through the LCD panel 34 in the vicinities of the markers 21 also.

With the LCD panel 34 of the LCD device according to the fourth embodiment of FIG. 17A, which is designed to operate in the normally white mode, the markers 21 are made of the same material as the reflecting members with high reflectivity. Therefore, the markers 21 can be visually recognized easily by utilizing the reflected light from the side of the opposite substrate 18 placed on the entrance side of the LCD device.

Accordingly, even if the LCD device is of the reflective or semi-transmissive type designed to operate in the normally white mode, the markers 21 can be visually recognized by the reflected light in the attachment operation of the optical element 32 to the LCD panel 34 by adopting the alignment direction regulators shown in FIG. 17A. As a result, the optical element 32 can be attached to the LCD panel 34 on which the polarizer plates 31*a* and 31*b* have been placed with high positional accuracy.

Fifth Embodiment

Figure 17B:
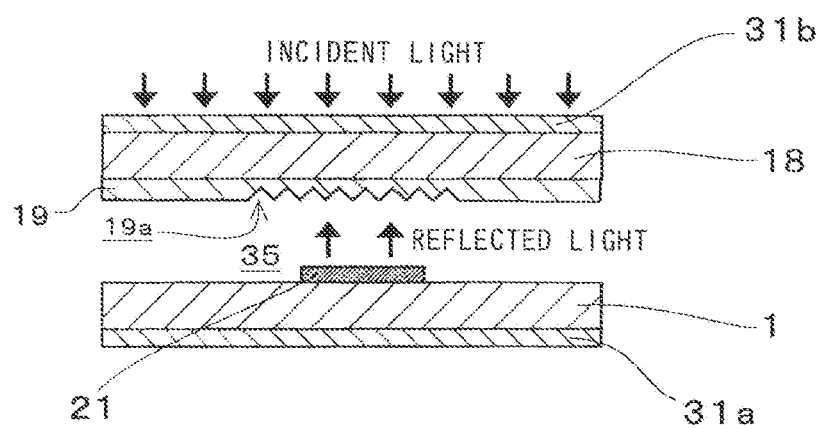
FIG. 17B is a partial cross-sectional view of the vicinity of one of the markers of a LCD device according to a fifth embodiment of the present invention.

FIG. 17B is a partial cross-sectional view of the vicinity of one of the markers 21, which shows the LCD panel 34 incorporated into a LCD device according to a fifth embodiment of the invention.

The LCD device according to the fifth embodiment is of the reflective or semi-transmissive type similar to the above-described fourth embodiment of FIG. 17A. However, this device is designed to operate in the normally black mode (see the second embodiment), which is unlike the fourth embodiment.

In the fifth embodiment, like the above-described fourth embodiment of FIG. 17A, the markers 21 are made of the same material as that of the reflecting members and are placed on the driver electrode 1 (concretely speaking, on the surface of the planarization film 10 or the non-illustrated transmission electrode). Illustration of the sealing material 30 is omitted in FIG. 17A.

The LCD panel 34 according to the fifth embodiment comprises parallel recesses (or protrusions) 19*a* formed on the overcoat film 19 on the opposite substrate 18, as shown in FIG. 17B. These recesses 19*a*, which are similar to the recesses 19*a* provided in the above-described second embodiment of FIGS. 14 and 15, are arranged locally at the corresponding positions on the opposite substrate 18 to the respective markers 21 formed on the driver substrate 1. For this reason, like the above-described second embodiment, the alignment direction of the liquid-crystal molecules in the vicinities of the markers 21 is different from that of the display region and therefore, the reflected light can pass through the opposite substrate 18 and the polarizer plate 18*b* formed thereon in the vicinities of the markers 21 locally. As a result, the markers 21 can be visually recognized easily by utilizing the reflected light from the side of the opposite substrate 18 placed on the entrance side of the LCD device.

In this way, even if the LCD device is of the reflective or semi-transmissive type designed to operate in the normally black mode, the markers 21 can be recognized by the reflected light in the attachment operation of the optical element 32 to the LCD panel 34 by adopting the alignment direction regulators shown in FIG. 17B. As a result, the optical element 32 can be attached to the LCD panel 34 on which the polarizer plates 31*a* and 31*b* have been placed with high positional accuracy.

In addition, the alignment films 12 and 12*b* are not illustrated in FIG. 17B. This is because the alignment films 12 and 12*b* are formed only in the display region and do not exist in the vicinities of the markers 21 and the regions opposite to the markers 21.

Needless to say, parallel recesses (or protrusions) may be additionally formed on the driver substrate 1 similar to the second embodiment of FIGS. 14 and 15.

Moreover, the recesses 19*a* may be removed and instead, the pairs of pixel electrodes 11 used in the third embodiment (see FIG. 16) may be provided near the markers 21 as the alignment direction regulator electrodes. In this case, similar to the third embodiment, the markers 21 can be visually recognized by the reflected light by applying a voltage across the pairs of the pixel electrodes 11 serving as the alignment direction regulator electrodes.

Sixth Embodiment

FIGS. 18A to 18D are schematic partial plan views showing the relationship between the plan shape of the markers 21 and the alignment direction of the liquid-crystal molecules in the vicinities of the said markers 21 in a LCD device according to a sixth embodiment, respectively. This device has a feature that the plan shape of the markers 21 is designed to have an edge or edges extending along the alignment direction of the liquid-crystal molecules.

Figure 18A:
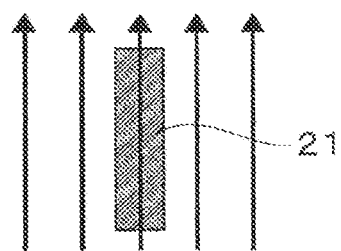
FIGS. 18A to 18D are schematic partial plan views showing the marker and the alignment direction of the liquid-crystal molecules in its vicinity of a LCD device according to a sixth embodiment of the present invention, respectively.

The plan shape of the marker 21 shown in FIG. 18A is rectangular (in other words, linear), the longitudinal direction (or the edges along the longitudinal direction) of which is (are) matched with the alignment direction of the liquid-crystal molecules.

Figure 18B:
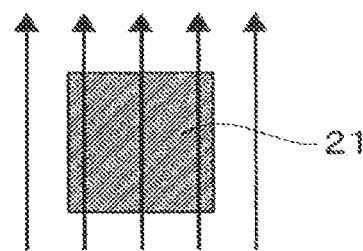

The plan shape of the marker 21 shown in FIG. 18B is square, the two sides (or the two edges) of which are matched with the alignment direction of the liquid-crystal molecules.

Figure 18C:
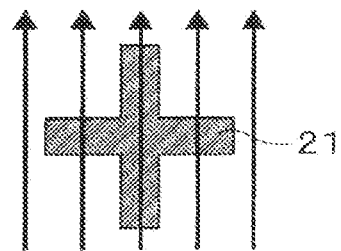

The plan shape of the marker 21 shown in FIG. 18C is cruciform (cross-shaped), the cross of which is formed by a rectangular (in other words, linear) part extending vertically and another rectangular (in other words, linear) part extending horizontally intersecting with each other. The vertical rectangular (or linear) part (or the edges along its the longitudinal direction) of the cruciform shape is (are) matched with the alignment direction of the liquid-crystal molecules. The vertical rectangular (or linear) part and the horizontal rectangular (or linear) part are approximately equal in width and length to each other.

Figure 18D:
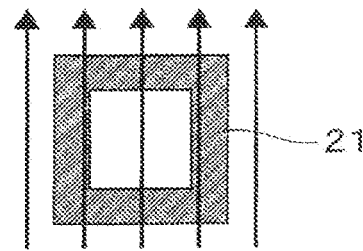

The plan shape of the marker 21 shown in FIG. 18D is of a square ring, which is formed by the combination of two rectangular (in other words, linear) parts extending vertically and two rectangular (in other words, linear) parts extending horizontally. The two vertical rectangular (or linear) parts (or the outer and inner edges along their the longitudinal direction) of the square ring-like shape are matched with the alignment direction of the liquid-crystal molecules. The vertical rectangular (or linear) parts and the horizontal rectangular (or linear) parts are approximately equal in width and length to each other.

With any of the markers 21 shown in FIGS. 18A to 18D, a level difference is generated between the marker 21 and the surface on which the marker 21 is formed, and the level difference thus formed is reflected on the alignment film 12*a* or 12*b* that covers the said marker 21. Therefore, there is a possibility that the alignment of the liquid-crystal molecules is disordered in the vicinities of the markers 21 due to the level difference. However, with any one of the markers 21 having the plan shapes shown in FIGS. 18A to 18D, the direction of the relatively longer part of the marker 21 and its outer or inner edges is matched or aligned to the alignment direction of the liquid-crystal molecules in the vicinity of the said marker 21. Therefore, the alignment of the liquid-crystal molecules near the outer or inner edges of the marker 21 is difficult to be affected by the level difference generated by the said marker 21. As a result, the accuracy of recognizing the said marker 21 can be enhanced.

The formation method of the markers 21 shown in FIG. 18A to 18D and the alignment method of the liquid-crystal molecules in the vicinities of the said markers 21 may be the same as those explained in one of the above-described first to fifth embodiments.

With the LCD device according to the sixth embodiment of FIGS. 18A to 18D, as described above, the alignment direction of the liquid-crystal molecules is aligned or matched to the pattern or edges of one of the markers 21 shown in FIGS. 18A to 18D in the vicinities of the level differences generated by the said marker 21. Therefore, the distortion of the alignment of the liquid-crystal molecules near the level difference by the said marker 21 can be minimized. This means that the accuracy of recognizing the said marker 21 can be enhanced.

Seventh Embodiment

Figure 19:
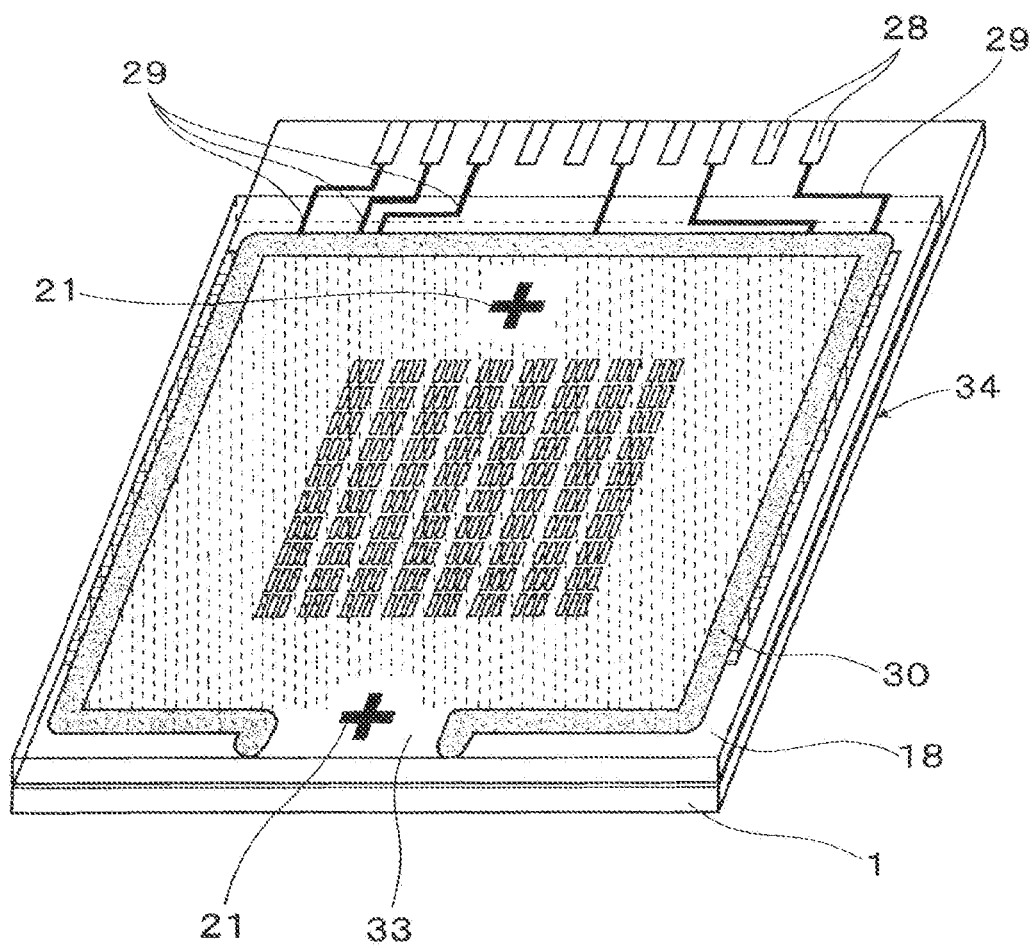
FIG. 19 is a perspective view showing the state where the driver substrate and the opposite substrate of a LCD device according to a seventh embodiment of the present invention are coupled, wherein polarizer plates are not yet attached thereto.

FIG. 19 is a perspective view of a LCD device according to a seventh embodiment of the present invention. This device has a feature that at least one of the markers 21 is formed in or near the liquid-crystal injection hole 33 in the non-display region. Although one of the markers 21 is located in or near the liquid-crystal injection hole 33 in FIG. 19, two or more of the markers 21 may be arranged in or near the hole 33.

When the liquid crystal 35 is injected into the gap between the driver substrate 1 and the opposite substrate 18 coupled and unified by utilizing the capillary action, the sealing material 30 is coated along the outer edges of the display region in such a way as to be open at the position for the liquid-crystal injection hole 33. The opened part of the material 30 is used as the liquid-crystal injection hole 33. Since the vicinity of the injection hole 33 is a vacant area where the gate line driving circuit 15, the source line driving circuit 16, and so on are not mounted, it is unnecessary to reserve separately the region for the said marker 21 placed in or near the hole 33. Accordingly, the distance between the sealing material 30 and the display region can be shortened. This means that a LCD device having a narrower picture-frame region can be fabricated.

The said marker 21 may be placed on any one of the driver substrate 1 and the opposite substrate 18 if it is located in or near the liquid-crystal injection hole 33. The count of the said markers 21 placed in or near the hole 33 is optionally determined.

With the LCD device according to the seventh embodiment of FIG. 19, at least one of the markers 21 is located in or near the liquid-crystal injection hole 33 on the side or edge of the driver or opposite substrate 1 or 18 to which the hole 33 belongs. Therefore, the effect that the picture-frame region is enlarged by the formation of the markers 21 can be minimized.

Other Embodiments

The above-described first to seventh embodiments are preferred examples of the present invention. Therefore, needless to say, the present invention is not limited to these embodiments and any modification is applicable to them.

For example, in the above-described first to seventh embodiments, each of the markers 21 has a cruciform plan shape; however, the invention is not limited to such the cruciform plan shape. Each of the markers 21 may have the shape shown in any one of FIGS. 18A to 18D, or any other shape if the marker 21 having the said plan shape can fulfill its function.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A liquid-crystal display device comprising:
    a liquid-crystal display panel comprising a main substrate, an opposite substrate, and a liquid crystal enclosed in a gap between the main substrate and the opposite substrate, wherein a polarizer plate is attached at least to the opposite substrate;
    markers to be used in an attachment operation of an optical element to the panel, the markers being formed at positions that overlap with the polarizer plate in a nondisplay region on the main substrate or the opposite substrate; and
    alignment direction regulators for regulating an alignment direction of molecules of the liquid crystal to a predetermined direction in vicinities of the markers, thereby allowing light to pass through at least the opposite substrate;
    wherein the panel is designed to operate in the normally black mode; and
    each of the alignment direction regulators is at least one electrode located in the vicinity of each of the markers, where the alignment direction of the molecules of the liquid crystal in the vicinities of the markers is differentiated from that of the molecules of the liquid crystal in the display region by applying a voltage to the electrodes.

* * * * *